(12) United States Patent
Feldpausch et al.

(10) Patent No.: US 6,311,440 B1
(45) Date of Patent: Nov. 6, 2001

(54) FLOOR MOUNTED UTILITY POST

(75) Inventors: Thomas G. Feldpausch, Hastings; George V. Weller, Shelbyville; Carl V. Forslund, III, East Grand Rapids; Frederick S. Faiks, Greenville, all of MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/342,722

(22) Filed: Jun. 29, 1999

Related U.S. Application Data

(63) Continuation-in-part of application No. 09/036,276, filed on Mar. 6, 1998, now Pat. No. 5,996,294, which is a continuation of application No. 08/063,463, filed on May 18, 1993, now Pat. No. 5,794,392.

(51) Int. Cl.[7] ..................................................... E04C 2/52

(52) U.S. Cl. ..................... 52/220.1; 52/220.3; 52/220.5; 312/223.2; 312/223.3

(58) Field of Search ................................ 52/220.1, 220.3, 52/220.5; 312/223.1, 223.3, 223.6

(56) References Cited

U.S. PATENT DOCUMENTS

| | | |
|---|---|---|
| 2,531,110 | 11/1950 | Cisler . |
| 3,423,898 | 1/1969 | Tracy et al. . |
| 3,539,138 | 11/1970 | Desroches . |
| 3,784,042 | 1/1974 | Hadfield et al. . |
| 3,889,044 | 6/1975 | Flachbarth et al. . |
| 3,909,502 | 9/1975 | Lacan . |
| 3,978,631 | 9/1976 | Diersing . |

(List continued on next page.)

FOREIGN PATENT DOCUMENTS

| | | |
|---|---|---|
| 1231330 | 12/1966 | (DE) . |
| 0067134 | 11/1982 | (EP) . |
| 0517938A1 | 12/1992 | (EP) . |
| 2647180 | 5/1990 | (FR) . |
| 1335829 | 10/1973 | (GB) . |
| 2190936 | 12/1987 | (GB) . |
| 2235621 | 3/1991 | (GB) . |

OTHER PUBLICATIONS

"Network Floor" by Kyodo Electric Co. Ltd. of Tokyo, Japan, 12 pgs., Mar. 1987.
"Cablefloor" by Co Design of Atlanta, Georgia, 2 pgs., Nov. 1990.
"Introducing Access" by CTEC of Grand Rapids, Michigan, 2 pgs., prior to May 30, 1995.
"Officeflor" by Stairfair Corporation of Charlotte, North Carolina, 1 pg., prior to May 30, 1995.
"Doppelboden H 16" by TSC Tek Sil Concepts, Incorporated of Haddonfield, New Jersey, 2 pgs., prior to May 30, 1995.
"Access Flooring" by Westinghouse and DEF Industries, Inc. of Dayton, Ohio, 2 pgs., prior to May 30, 1995.
"Q Floor/Taproute" by Robertson, 2 pgs., prior to May 30, 1995.
"Norina Cavity–Floor . . . " by Norina Bautechnick of GmbH of Nurnberg, Germany, 2 pgs., prior to May 30, 1995.

Primary Examiner—Carl D. Friedman
Assistant Examiner—Jennifer I. Thissell
(74) Attorney, Agent, or Firm—Price, Heneveld Cooper, DeWitt & Litton

(57) ABSTRACT

A floor mounted utility post includes a floor tile from a pre-fabricated floor construction, wherein the floor tile has at least two cutouts positioned at separate edges of the floor tile. A pair of vertical raceway channels are secured to the floor tile, and each vertical raceway channel is in communication with one of the cutouts. A door is mounted to a first of the vertical raceways, wherein the door and the pair of vertical raceway channels, in combination, define a partial enclosure. A top is supported by the raceway channel.

30 Claims, 18 Drawing Sheets

U.S. PATENT DOCUMENTS

| | | |
|---|---|---|
| 4,016,357 | 4/1977 | Abrahamsen . |
| 4,040,755 | 8/1977 | Jorgensen et al. . |
| 4,065,890 | 1/1978 | Fenner . |
| 4,074,488 | 2/1978 | Ray, III . |
| 4,092,486 | 5/1978 | Myers . |
| 4,124,324 | 11/1978 | Augis et al. . |
| 4,218,579 | 8/1980 | Joly . |
| 4,220,808 | 9/1980 | Fujita . |
| 4,252,989 | 2/1981 | Blumenthal . |
| 4,257,203 | 3/1981 | Propst et al. . |
| 4,296,574 | 10/1981 | Stephens . |
| 4,353,411 | 10/1982 | Harter et al. . |
| 4,373,111 | 2/1983 | Myers et al. . |
| 4,408,543 | 10/1983 | Griffin . |
| 4,442,645 | 4/1984 | Hiller et al. . |
| 4,470,232 | 9/1984 | Condeveaux et al. . |
| 4,475,322 | 10/1984 | Russo et al. . |
| 4,479,030 | 10/1984 | Votteler et al. . |
| 4,484,426 | 11/1984 | Simms . |
| 4,577,055 | 3/1986 | Wuertz . |
| 4,606,394 | 8/1986 | Bannister . |
| 4,608,066 | 8/1986 | Cadwell, Jr. . |
| 4,630,417 | 12/1986 | Collier . |
| 4,631,879 | 12/1986 | Kobayashi et al. . |
| 4,682,453 | 7/1987 | Holmgren . |
| 4,750,305 | 6/1988 | Bastian . |
| 4,771,583 | 9/1988 | Ball et al. . |
| 4,773,196 | 9/1988 | Yoshida et al. . |
| 4,863,223 | 9/1989 | Weissenbach et al. . |
| 4,883,503 | 11/1989 | Fish . |
| 4,902,852 | 2/1990 | Wuertz . |
| 5,019,672 | 5/1991 | Fish . |
| 5,052,157 | 10/1991 | Ducroux et al. . |
| 5,081,809 | 1/1992 | Thompson . |
| 5,150,554 | 9/1992 | Quinlan, Jr. et al. . |
| 5,186,337 | 2/1993 | Foster et al. . |
| 5,195,286 | 3/1993 | DeLong et al. . |
| 5,207,041 | 5/1993 | Wills . |
| 5,284,255 | 2/1994 | Foster et al. . |
| 5,378,058 | 1/1995 | Tessmer . |
| 5,417,401 | 5/1995 | Thompson et al. . |
| 5,548,086 | 8/1996 | Greenfield et al. . |
| 5,574,251 | 11/1996 | Sevier . |
| 5,618,090 | 4/1997 | Montague et al. . |
| 5,628,157 | 5/1997 | Chen . |
| 5,630,300 | 5/1997 | Chen . |
| 5,644,876 | 7/1997 | Walker . |
| 5,660,120 | 8/1997 | Sims . |
| 5,673,632 | 10/1997 | Sykes . |
| 5,675,949 | 10/1997 | Forslund et al. . |
| 5,685,113 | 11/1997 | Reuter et al. . |
| 5,697,193 | 12/1997 | Forslund, III et al. . |
| 5,784,841 | 7/1998 | Nowell . |
| 5,794,392 | 8/1998 | Forslund, III et al. . |
| 5,921,795 | 7/1999 | Weener et al. . |
| 5,996,294 | 12/1999 | Forslund, III et al. . |

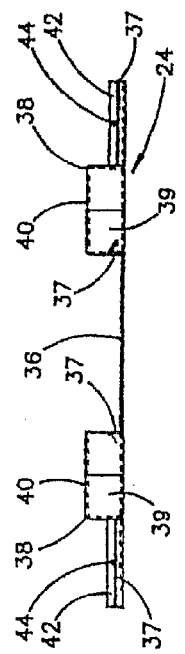
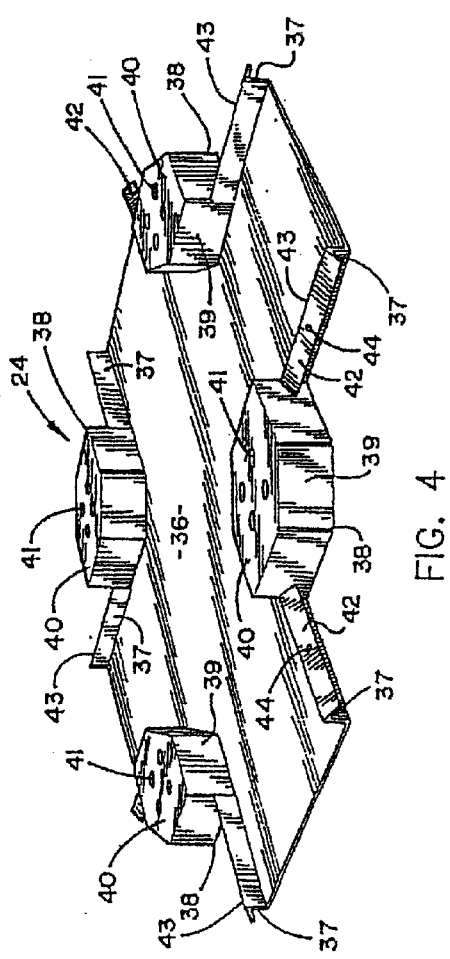
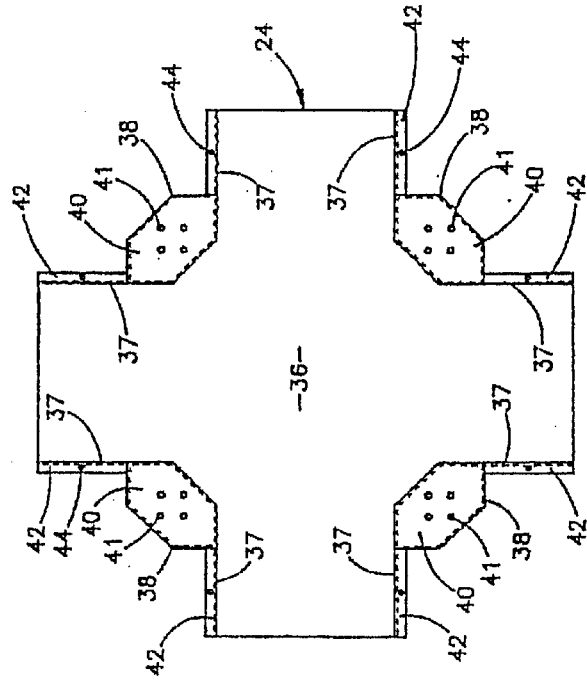
FIG. 5
FIG. 4
FIG. 6

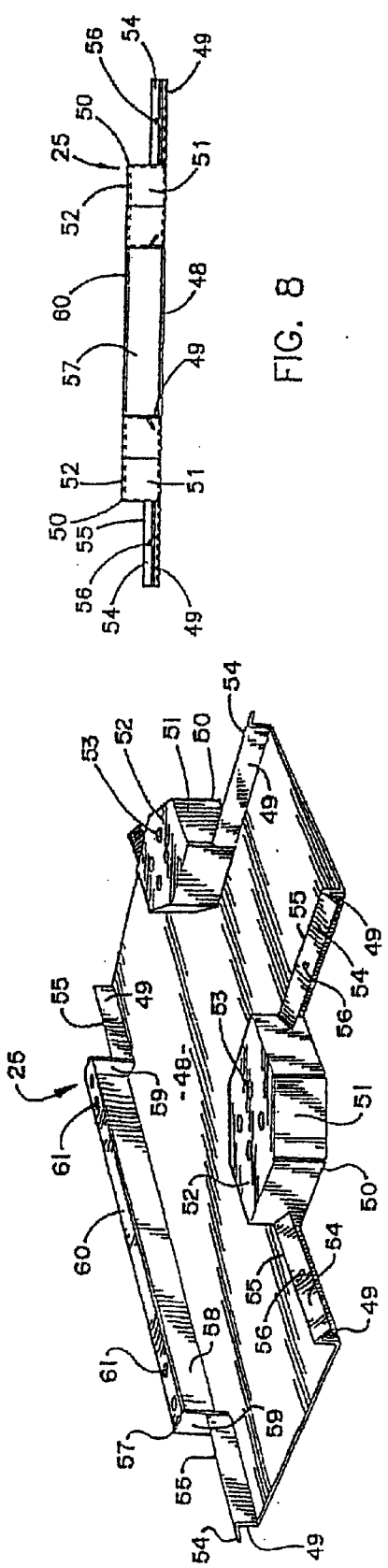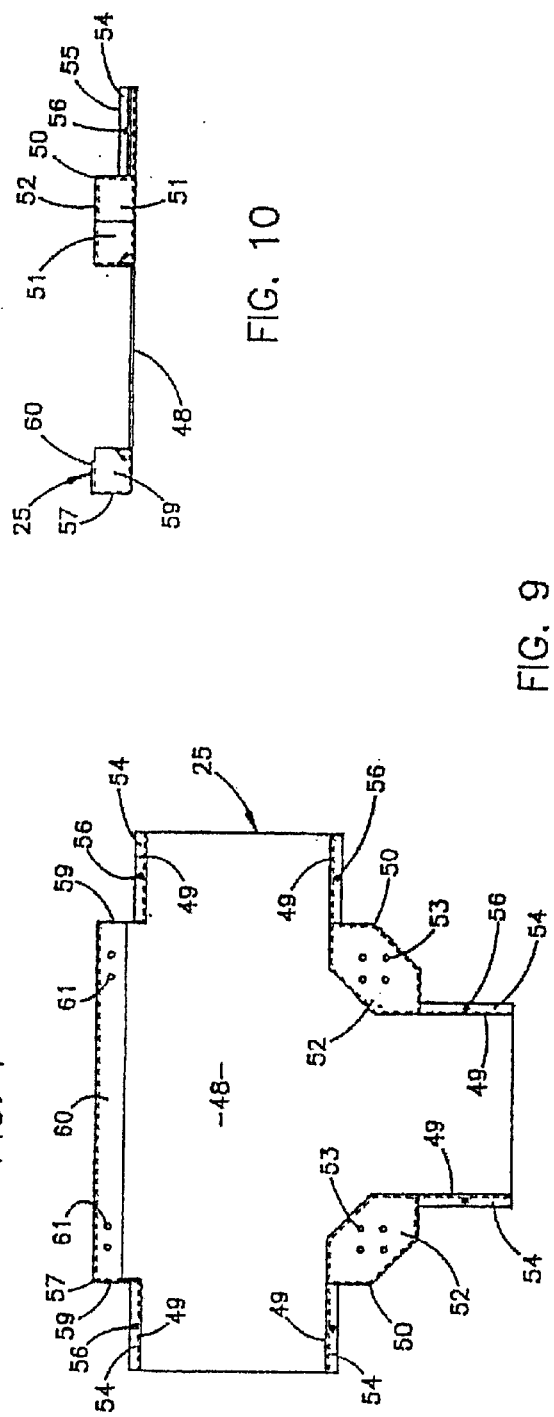

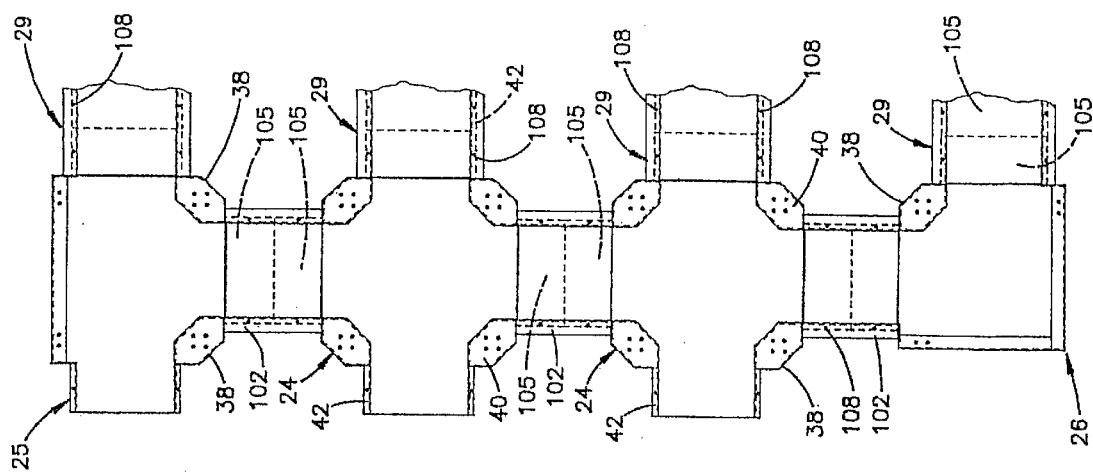
FIG. 24
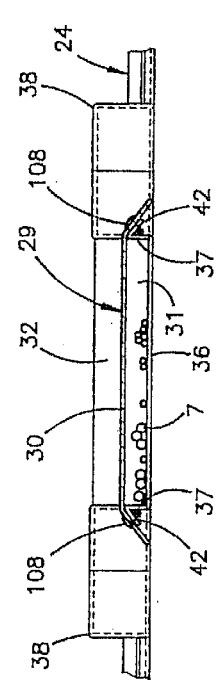
FIG. 25
FIG. 26
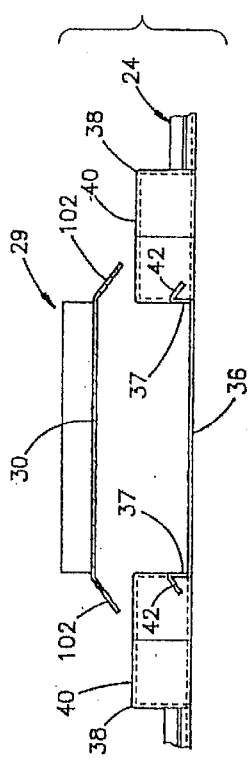
FIG. 27
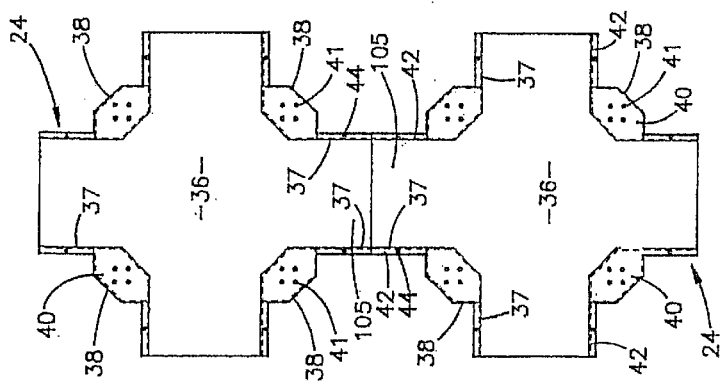
FIG. 23

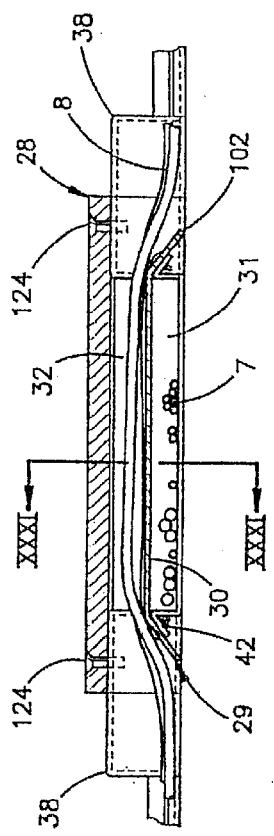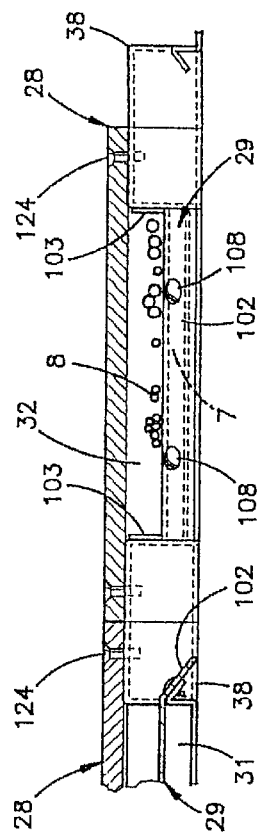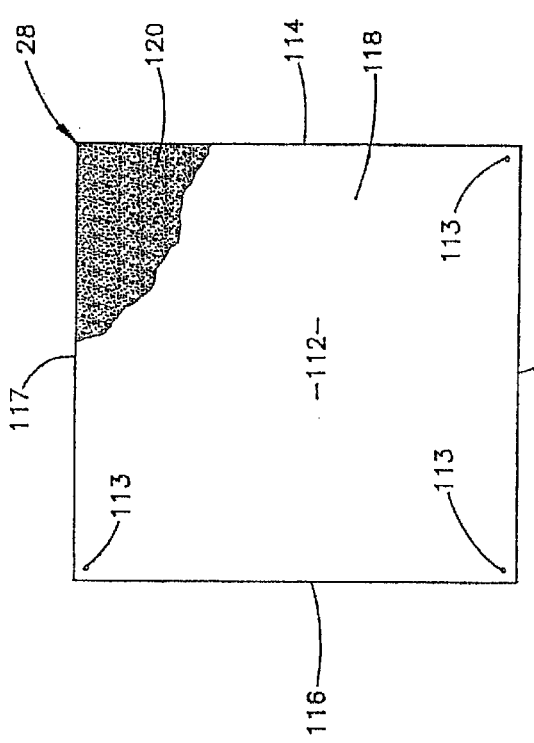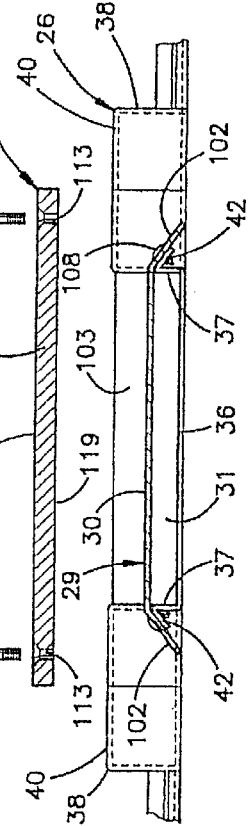

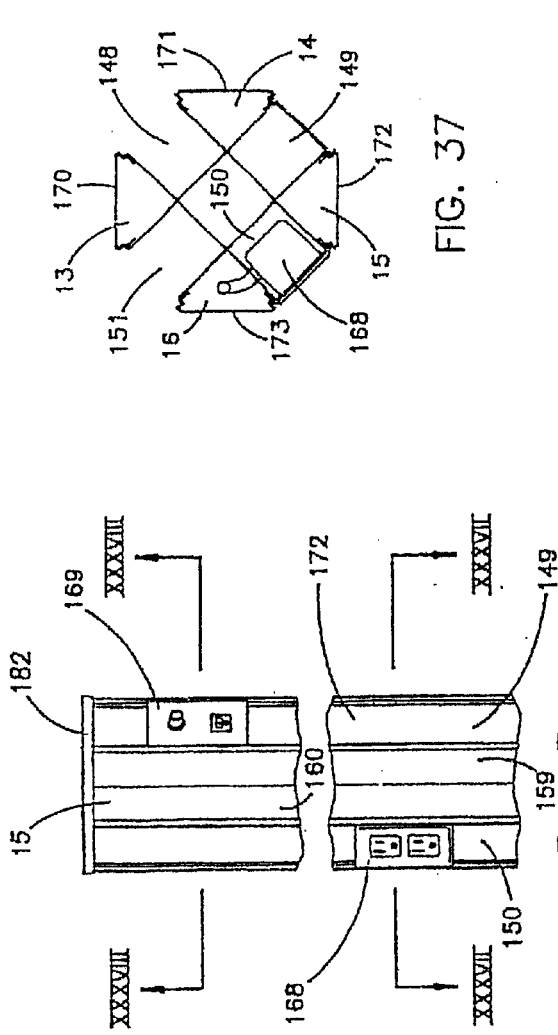

FLOOR MOUNTED UTILITY POST

CROSS-REFERENCES TO RELATED APPLICATIONS

The present application is a continuation-in-part of Ser. No. 09/036,276 commonly assigned U.S. Pat. No. 5,996,294, filed Mar. 6, 1998, entitled UTILITY DISTRIBUTION SYSTEMS FOR OPEN OFFICE PLANS AND THE LIKE, which is a continuation of Ser. No. 08/063,463 commonly assigned U.S. Pat. No. 5,794,392, filed May 18, 1993, entitled UTILITY DISTRIBUTION SYSTEMS FOR OPEN OFFICE PLANS AND THE LIKE.

BACKGROUND OF THE INVENTION

The present invention relates to the distribution of utilities in open office plans and the like, and in particular to a utility post for use in combination with a prefabricated floor construction.

Open office plans are increasingly being outfitted with reconfigurable office utility distribution systems. The need for readily reconfigurable utility distribution systems in modern offices is the result of the more complicated and sophisticated utilities now required by office users. Such utilities include communications, computers, and other types of data processors, electronic displays, as well as lighting, electrical power, HVAC and the like. Such utility distribution is now widely being provided through raised floor structures, wherein the raised floor structures include routing features for these utilities. Because of the sensitive nature of some of the utility conduits, such as those carrying data and communications information, they must also be routed separately from the more standard utilities such as electrical power and lighting.

While the routing of such utilities and the distribution thereof to the office workers and users has been primarily through powerways within moveable office paneling, the increasingly sophisticated nature of the office needs requires further innovations for the distribution of those utilities in open office areas. Specifically, the distribution of office utilities has evolved beyond merely the hard wiring of various utility conduits to specific office areas and now includes the integration of electronic equipment to further facilitate such distribution. There is a need to provide mountings and housings for this equipment, which are both readily accessible within the open office environment and capable of being readily reconfigurable with the changeable office layout to accommodate new organizations and project teams as those changes are desired.

SUMMARY OF THE INVENTION

One aspect of the present invention is to provide a floor mounted utility post for use in open office plans and other similar environments. The floor mounted utility post includes a floor tile shaped for installation in a pre-fabricated floor construction, wherein the floor tile has at least two cutouts positioned at separate edges of the floor tile. A pair of vertical raceway channels are secured to the floor tile, and each vertical raceway channel communicates with one of the floor tile cutouts. The raceway channels support a top mounted thereon. A door is mounted to a first of the vertical raceways, wherein the door, the top and the pair of vertical raceway channels, in combination, define a partial enclosure.

Another aspect of the present invention is a floor mounted utility post in combination with a prefabricated floor construction, wherein the floor construction comprises a plurality of floor tiles, adapted to be abuttingly supported on a building floor. The floor construction includes a hollow interior portion, defining at least one floor raceway to route at least one utility conduit therethrough. The utility post comprises a bottom configured to replace one of the floor tiles in the prefabricated floor construction. The bottom has a notch in at least one peripheral edge, and communicates with the floor raceway for routing utility conduits therethrough. Two outwardly facing vertical raceways extend upwardly from adjacent peripheral edges of the bottom, wherein at least a first of the vertical raceways is in communication with the notch. A door is mounted to a flange of one of the vertical raceways, for selective access to an interior of the utility post, wherein the door is moveable between a closed position and an open position. A top is supported by upper edges of the two adjacent vertical raceways.

Yet another aspect of the present invention is a utility cabinet comprising a pair of adjacent floor mounted utility posts in combination with a prefabricated floor construction. The floor construction comprises a plurality of floor tiles adapted to be abuttingly supported on a building floor, and includes a hollow interior portion defining at least one floor raceway to route at least one utility conduit therethrough. Each utility post includes a bottom configured to replace one of the floor tiles in the prefabricated floor construction and has a notch in at least one peripheral edge. The notch is in communication with the one floor raceway for routing the utility conduit therethrough. Pach post also includes at least one outwardly facing vertical raceway extending upwardly from a peripheral edge of the bottom and in communication with the notch. A door mounted to the vertical raceway and vertically aligned with a second peripheral edge of the bottom for selective access to an interior of said utility post. The door is movable between a closed position and an open position. A top is at least partially supported by an upper edge of the at least one vertical raceway.

Still another aspect of the present invention is a method of constructing a floor mounted utility post for use with a prefabricated floor structure. This method comprises the steps of fabricating at least two vertical utility raceways, constructed to receive office utility conduits therein, and further wherein at least one vertical side of the raceway is open. A bottom of a first of the raceways is fastened proximate to a first edge of a floor tile of the prefabricated floor. A bottom of a second of the raceways is fastened proximate a second edge of the floor tile, the second edge being adjacent to the first edge, and at least a portion of the second raceway is proximate to a third edge of the floor tile. A door is mounted to the second raceway portion, which is proximate the third edge of the floor tile, wherein the door is moveable between a closed position and an open position, permitting access to an interior of a post. A post top is fastened to a top of each of the vertical raceways.

These and other features, advantages and objects of the present invention will be further understood and appreciated by those skilled in the art by reference to the following specification, claims and appended drawings.

BRIEF DESCRIPTION OF THE DRAWINGS

FIG. 4 is a perspective view of an X-shaped floor pan portion of the floor construction.

FIG. 5 is a side elevational view of the X-shaped floor pan.

FIG. 6 is a top plan view of the X-shaped floor pan.

FIG. 7 is a perspective view of a T-shaped floor pan portion of the floor construction.

FIG. 8 is front elevational view of the T-shaped floor pan.

FIG. 9 is a top plan view of the T-shaped floor pan.

FIG. 10 is a side elevational view of the T-shaped floor pan.

FIG. 23 is a top plan view of a pair of X-shaped floor pans positioned adjacent one another prior to interconnection.

FIG. 24 is a fragmentary cross-sectional view of the X-shaped floor pans shown in FIG. 23, with a connector bridge positioned thereover for interconnecting the same.

FIG. 25 is a fragmentary, cross-sectional view of the X-shaped connector pans shown in FIG. 23, wherein the connector bridge is positioned bridging the same prior to attachment.

FIG. 26 is a fragmentary, cross-sectional view of the X-shaped connector pans shown in FIG. 23, wherein the connector bridge is attached thereto, and wires are routed through associated raceways.

FIG. 27 is a fragmentary, top plan view of a plurality of different types of floor pans interconnected by associated bridges prior to routing cabling therethrough.

FIG. 28 is a top plan view of a cover plate portion of the floor construction.

FIG. 29 is a fragmentary, cross-sectional view of an X-shaped floor pan with an associated cover plate positioned thereover prior to attachment.

FIG. 30 is a fragmentary, cross-sectional view of the X-shaped floor pan and cover plate shown in FIG. 29, wherein the cover plate is fastened to the floor pan, and wires are routed through raceways formed therein.

FIG. 31 is a cross-sectional view of the floor construction shown in FIG. 30, taken along the line XXXI—XXXI, FIG. 30.

FIG. 36 is a partially schematic, fragmentary cross-sectional view of the floor construction with a utility post mounted thereon.

FIG. 37 is a cross-sectional view of the utility post shown in FIG. 36, taken along the line XXXVII—XXXVII, FIG. 36.

FIG. 38 is a cross-sectional view of the utility post shown in FIG. 36, taken along the line XXXVIII—XXXVIII, FIG. 36.

DETAILED DESCRIPTION OF THE PREFERRED EMBODIMENTS

Figure 1:
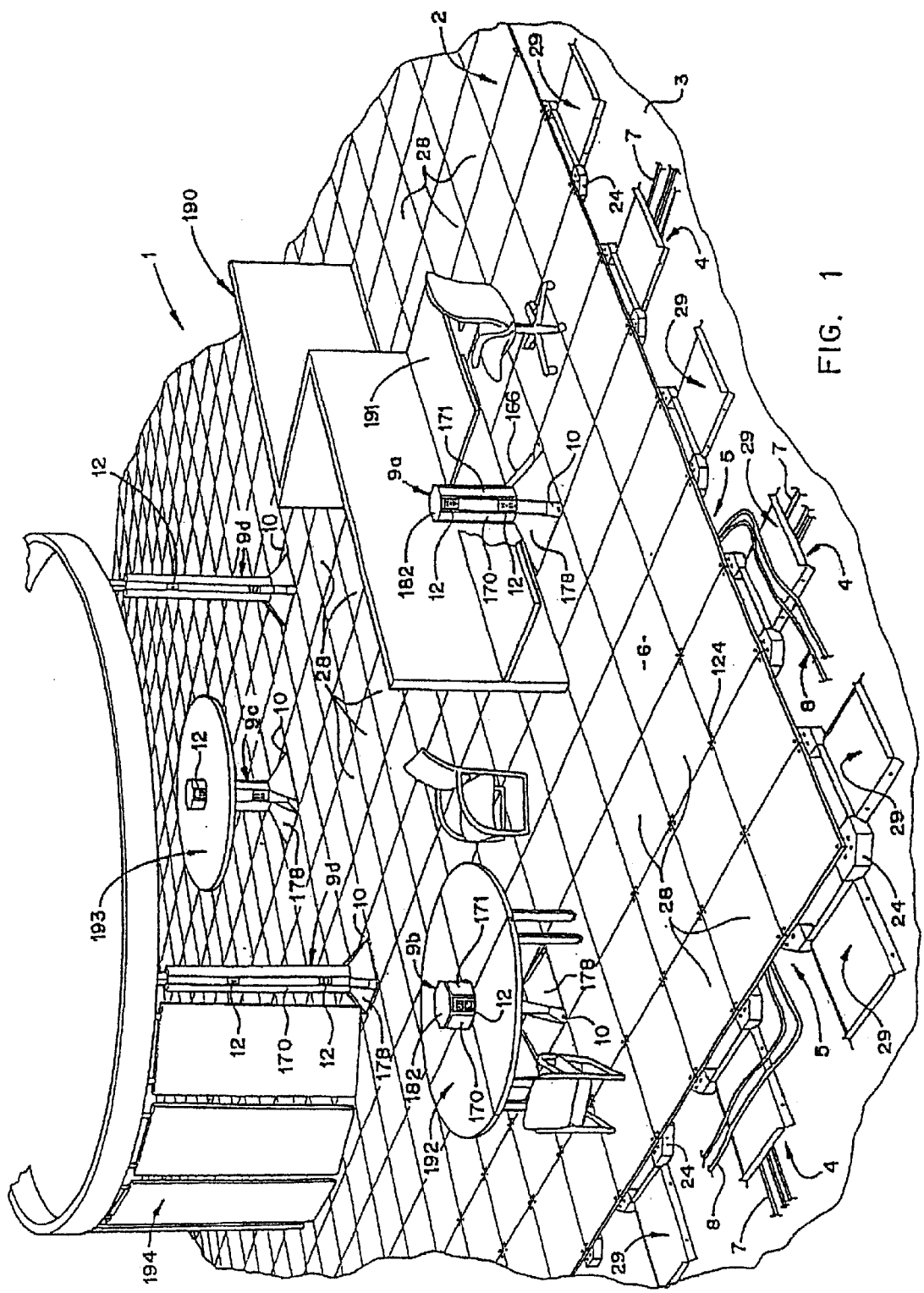
FIG. 1 is a fragmentary perspective view of a utility distribution system embodying the present invention, comprising a prefabricated floor construction, and associated utility posts.
Figure 2:
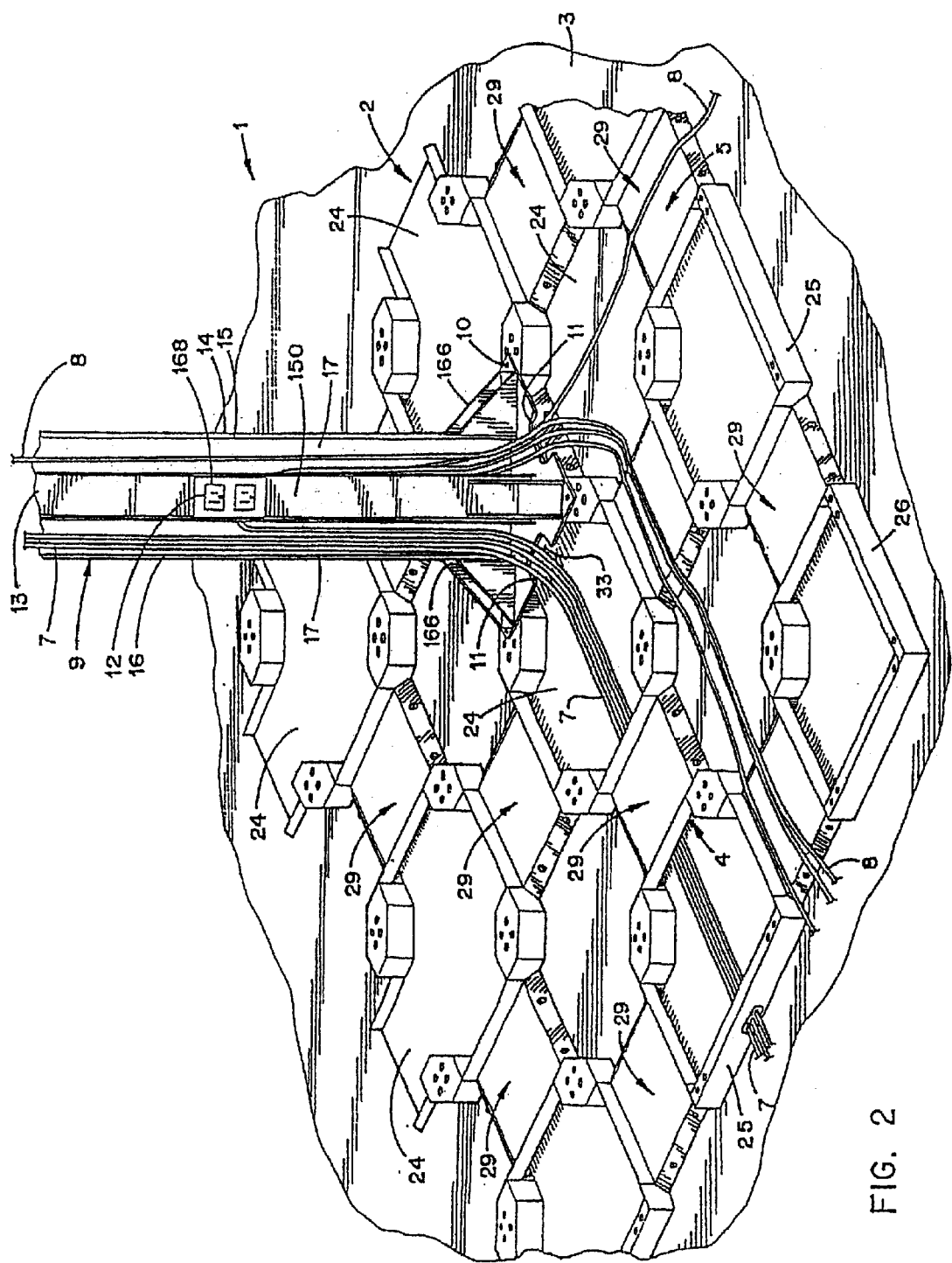
FIG. 2 is a fragmentary perspective view of the floor construction and one of the utility posts, wherein cover plate portions of the floor construction have been removed to reveal internal construction.
Figure 43:
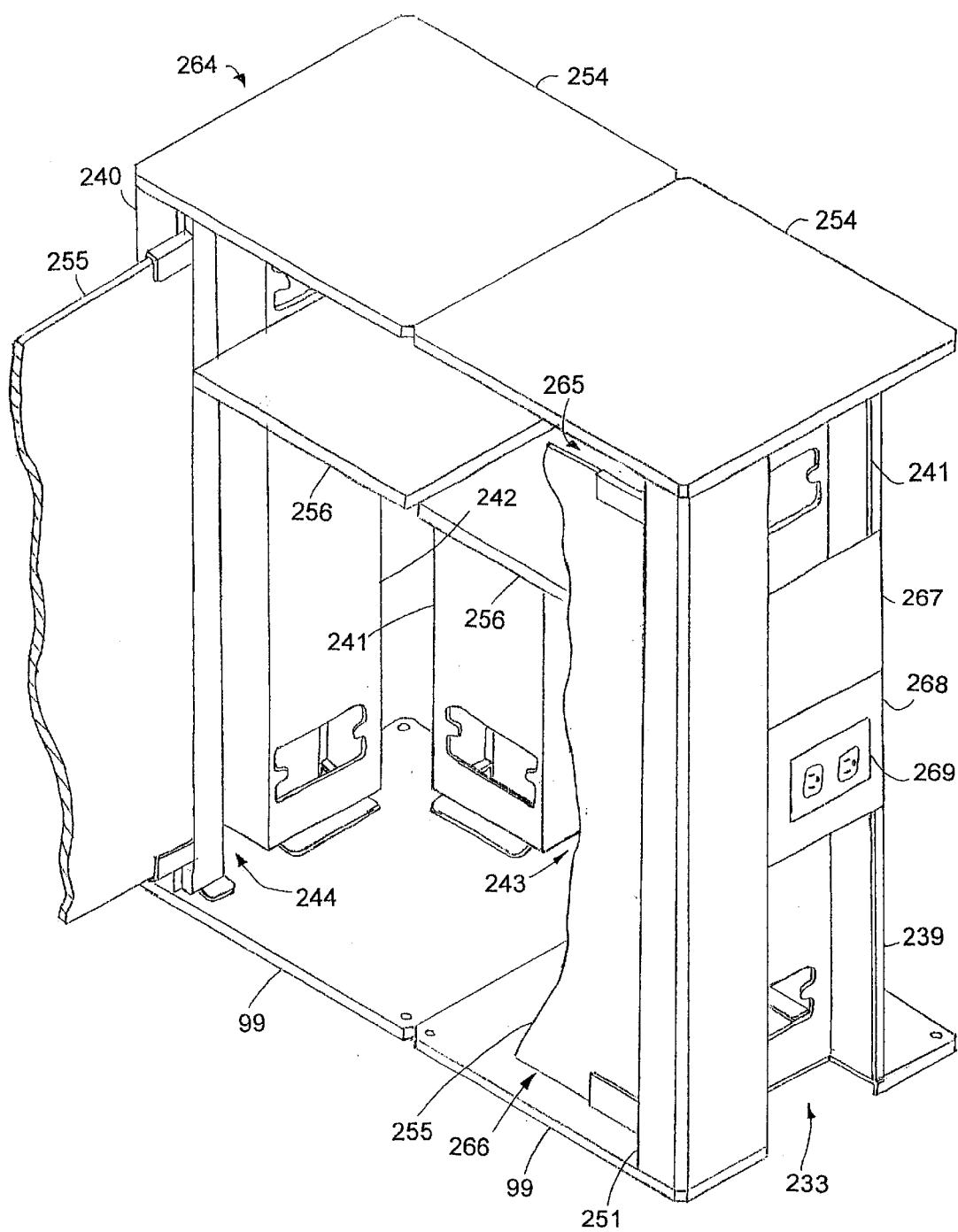
FIG. 43 is a perspective view of two adjacent floor mounted utility posts of the second embodiment of the floor mounted utility post with the doors removed for clarity, wherein the adjacent posts form an equipment cabinet.
Figure 44:
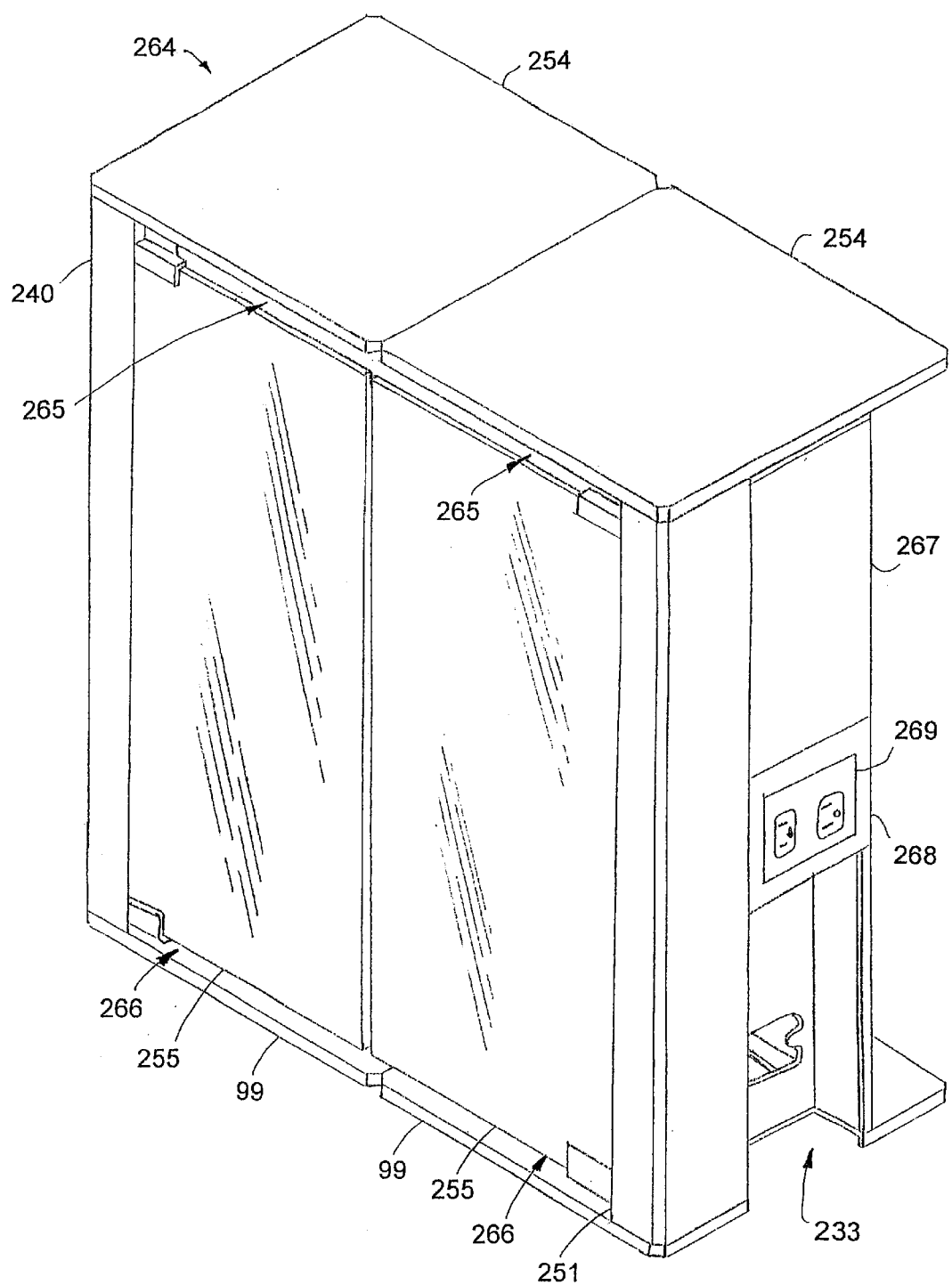
FIG. 44 is a perspective view of two adjacent floor mounted utility posts of the second embodiment of the floor mounted utility posts of FIG. 43 with the doors closed.

For purposes of description herein, the terms "upper", "lower", "right", "left", "rear", "front", "vertical", "horizontal", and derivatives thereof shall relate to the invention as oriented in FIGS. 1, 2 and 43. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates a utility distribution system embodying the present invention, which is particularly designed for use in open office plans, and other similar settings and environments. In the illustrated example, utility distribution system 1 includes a prefabricated floor construction 2 configured to be supported on a building floor 3. Floor construction 2 has a hollow interior arrangement that defines raceways 4 and 5 to route utility conduits 7 and 8 therethrough, and a floor surface 6 on which workstations may be positioned. It is to be understood that the term "utility conduit" as used herein contemplates various devices and arrangements for transmitting utilities between two points, such as air ducts, fluid pipes, electrical wires, fiber optic cables, and the like. The illustrated distribution system 1 also includes at least one utility post 9 having a foot portion 10 which mounts to floor construction 2 to support utility post 9 in a generally upstanding orientation. The foot portion 10 of utility post 9 has an open area 11 (FIG. 2) disposed above and communicating with at least one of the floor raceways 4 and 5. At least one utility outlet 12 is mounted on utility post 9, and is adapted to dispense a selected utility therefrom, such as electrical power, communication signals, HVAC, condition water, etc. Utility post 9 has utility channels 13–16, each having an outwardly oriented open face 17, and being shaped so that one or more of the utility conduits 7 or 8 can be routed therein. Each one of the utility channels 13–16 extends continuously between and communicates with an associated utility outlet 12 and an associated open area 11 of utility post foot 10, such that utilities can be readily provided to the workstations by simply pulling selected utility conduits 7 and 8 from floor raceways 4 and 5, through the open areas 11 in the foot portion 10 of an adjacent utility post 9, and then laying them into the utility channels 13–16 of utility post 9 by insertion into the open faces 17 thereof to a location adjacent the utility outlets 12 for connection therewith.

In the illustrated example, floor construction 2 (FIG. 3) is a prefabricated assembly that is designed to be supported directly on top a conventional building floor. Floor construction 2 includes a plurality of floor base members or pans 24–27, which are abuttingly supported on the floor surface 6 in a mutually adjacent, lattice like arrangement. Each of the floor pans 24–27 has a generally U-shaped configuration, with a base that defines at least a portion of the raceway 4 extending generally continuously throughout floor construction 2. Rigid cover plates 28 are supported on floor pans 24–27 in a mutually adjacent arrangement to generally enclose raceway 4, and define the continuous floor surface 6 thereover. A plurality of connector bridges 29 extend between adjacent floor pans 24–27, and are attached thereto to physically interconnect the same. Connector bridges 29 each include a separator plate 30 (FIGS. 25 & 26) positioned a spaced apart distance above the bases of the adjacent floor pans 24–27 to form thereunder a lower connector raceway 31, which in combination with raceway 4, is adapted to receive a first type of utility therein, such as power conduits 7. The separator plate 30 of connector bridge 29 is positioned a spaced apart distance below the overlying cover plates 28 (FIGS. 30 & 31) to form thereover an upper connector raceway 32, oriented generally perpendicular to the lower connector raceway 31, which in combination with raceway 5 is adapted to receive and retain a second utility therein, such as communication or signal conduits 8. In this fashion, the power conduits 7 and signal conduits 8 can be routed through floor construction 2, while being physically separated from one another, so as to avoid both physical and/or functional interference between the same. It is to be understood that floor pans 24–27 may take a variety of different shapes and configurations, and in the examples illustrated herein, floor construction 2 includes an X-shaped floor pan 24, a T-shaped floor pan 25, an L-shaped floor pan 26, and a diagonal floor pan 27, all of which are mutually interconnected by connector bridges 29, and enclosed by cover plates 28, as discussed in greater detail hereinafter.

With reference to FIGS. 4–6, the illustrated X-shaped floor pan 24 is rigid, and has a generally U-shaped vertical cross-sectional configuration, comprising an X-shaped base 36, and four pairs of upstanding sidewalls 37. X-shaped floor pan 24 has four raised pedestals 38 positioned adjacent each exterior corner of pan base 36, which are configured to support cover plates 28 thereon. Each pedestal 38 has a generally hexagonal top plan configuration, with six sidewalls 39, and an upper pad 40 with four fastener apertures 41 therethrough arranged in a square pattern. Each pair of upstanding pan sidewalls 37 associated with X-shaped floor pan 24 has an angle flange 42 along its upper edge 43, which angle flange 42 extends downwardly therefrom at an angle of approximately 45 degrees. Each angled flange 42 has a perpendicularly oriented fastener aperture 44 therethrough for attaching an associated connector bridge 29. The upper edge 43 of each pair of pan sidewalls 37 is positioned at a preselected distance below the upper pad 40 of the associated raised pedestal 38 to accommodate the mounting of a connector bridge 29 on angle flanges 42, and thereby separating or dividing the interior space of X-shaped floor pan 24 between lower connector raceway 31, and upper connector raceway 32, as described in greater detail below. In the illustrated example, the upper edges 43 of each pair of floor pan sidewalls 37 are positioned at around the vertical midpoint of the associated raised pedestal 38.

With reference to FIGS. 7–10, the illustrated T-shaped floor pan 25 is rigid, and has a generally U-shaped vertical cross-sectional configuration, comprising a T-shaped base 48, and three pairs of upstanding sidewalls 49. T-shaped floor pan 25 has two raised pedestals 50 positioned adjacent the interior facing corners of pan base 48, which are configured to support cover plates 28 thereon. Each pedestal 50 has a generally hexagonal top plan configuration, with six sidewalls 51, and an upper pad 52 with four fastener apertures 53 therethrough arranged in a square pattern. Each pair of upstanding pan sidewalls 49 associated with T-shaped floor pan 25 has an angle flange 54 along its upper edge 55, wherein angle flange 54 extends downwardly therefrom at an angle of approximately 45 degrees. Each angle flange 54 has a perpendicularly oriented fastener aperture 56 therethrough for attaching an associated connector bridge 29. The upper edge 55 of each pair of pan sidewalls 49 is positioned a preselected distance below the upper pad 52 of the associated raised pedestal 50 to accommodate the mounting of connector bridge 29 on angle flanges 54, and thereby separating or dividing the interior space in T-shaped floor pan 25 between lower connector raceway 31, and upper connector raceway 32, as described in greater detail below. In the illustrated example, the upper edges 55 of each pair of floor pan sidewalls 49 are positioned at around the vertical midpoint of the associated raised pedestal 50. A raised support channel 57 extends along the exterior edge of pan base 48, and includes a sidewall 58, end walls 59, and an upper flange 60 positioned generally level with the upper pads 52 of pedestals 50. The upper flange 60 of support channel 57 is shaped to support cover plates 28 thereon, and includes four perpendicularly oriented fastener apertures 61 therethrough to facilitate connection with cover plates 28.

Figure 12:
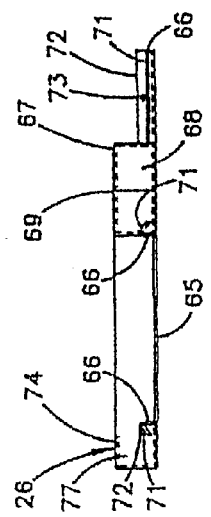
FIG. 12 is a side elevational view of the L-shaped floor pan.
Figure 11:
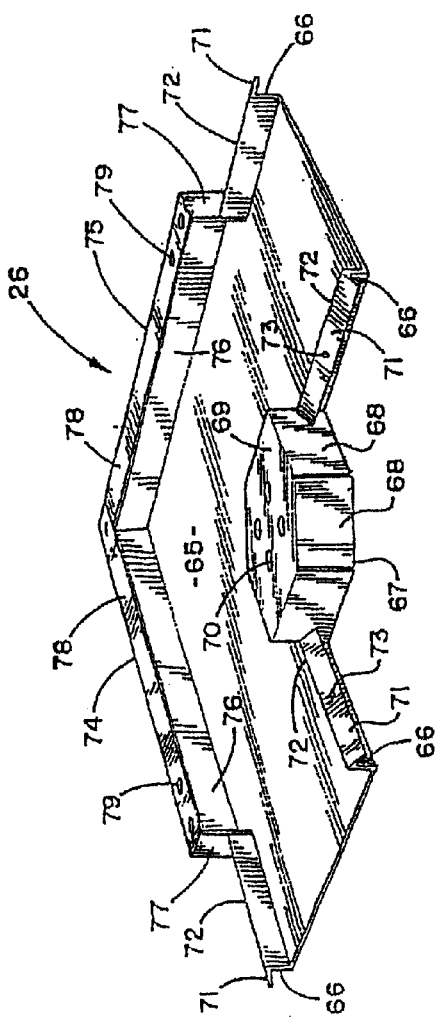
FIG. 11 is a perspective view of an L-shaped floor pan portion of the floor construction.
Figure 13:
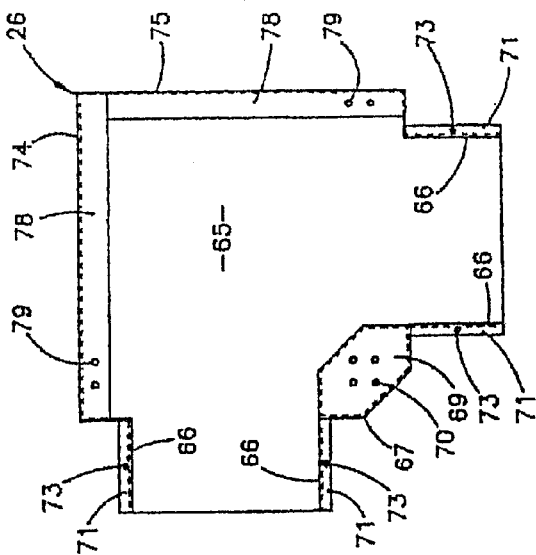
FIG. 13 is a top plan view of the L-shaped floor pan.
Figure 15:
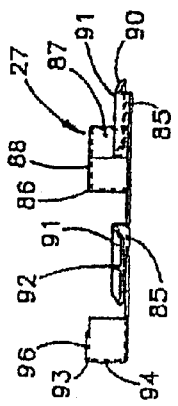
FIG. 15 is a side elevational view of the diagonal floor pan.
Figure 17:
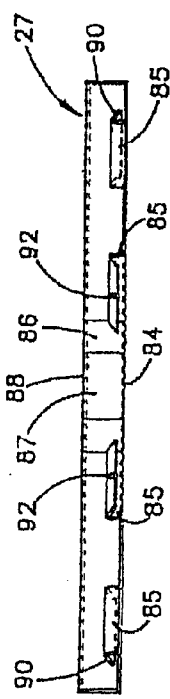
FIG. 17 is a front elevational view of the diagonal floor pan.
Figure 14:
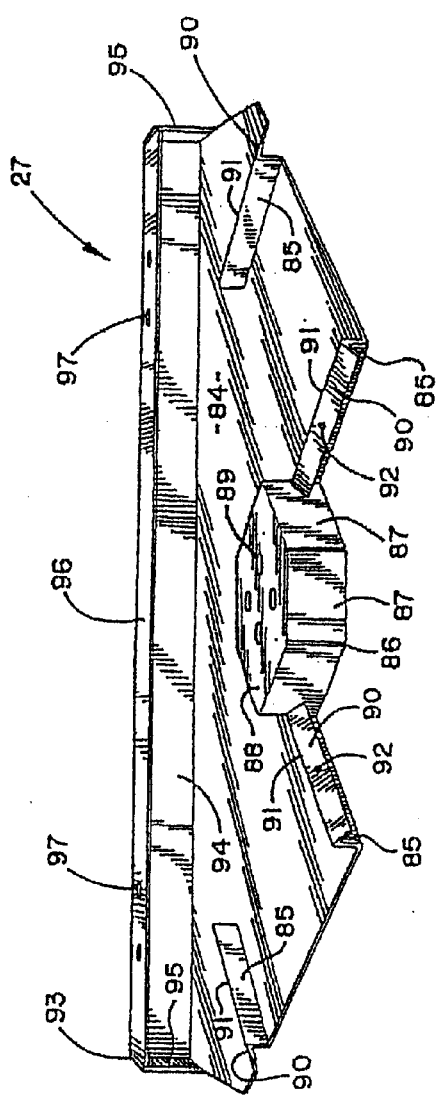
FIG. 14 is a perspective view of a diagonal floor pan portion of the floor construction.
Figure 16:
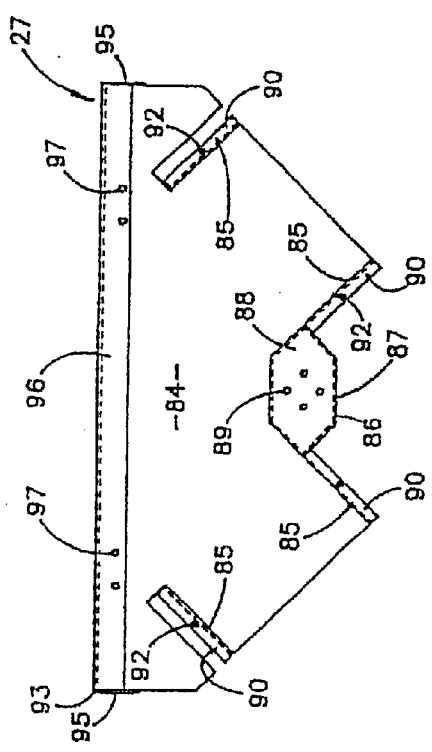
FIG. 16 is a top plan view of the diagonal floor pan.
Figure 19:
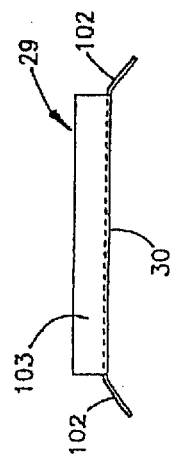
FIG. 19 is a front elevational view of the connector bridge.
Figure 21:
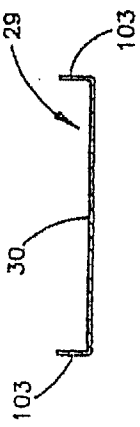
FIG. 21 is a cross-sectional view of the connector bridge, taken along the line XXI—XXI, FIG. 20.
Figure 22:
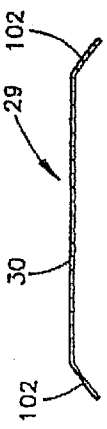
FIG. 22 is a cross-sectional view of the connector bridge, taken along the line XXII—XXII, FIG. 20.
Figure 18:
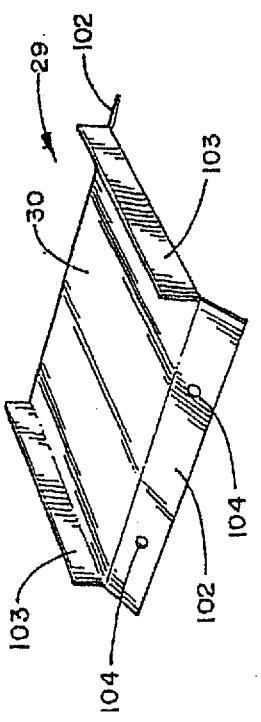
FIG. 18 is a perspective view of a connector bridge portion of the floor construction.
Figure 20:
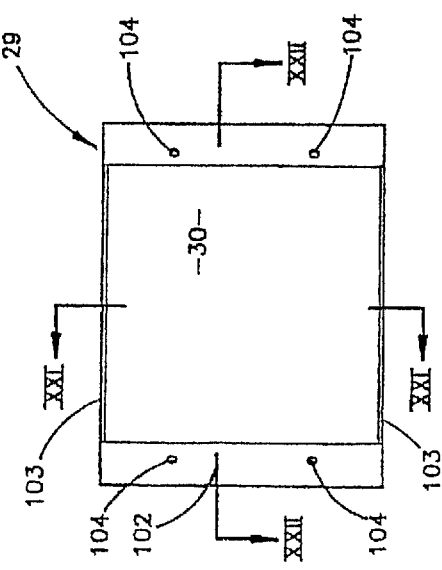
FIG. 20 is a top plan view of the connector bridge.

With reference to FIGS. 11–13, the illustrated L-shaped floor pan 26 is rigid, and has a general U-shaped vertical cross-sectional configuration, comprising an L-shaped base 65, and two pairs of upstanding sidewalls 66. L-shaped floor pan 26 has one raised pedestal 67 positioned adjacent the interior facing corner of pan base 65, and is configured to support cover plates 28 thereon. Pedestal 67 has a generally hexagonal top plan configuration, with six sidewalls 68, and an upper pad 69 with four perpendicularly oriented fastener apertures 70 therethrough arranged in a square pattern. Each pair of upstanding pan sidewalls 66 associated with L-shaped floor pan 26 has an angle flange 71 extending along its upper edge 72, wherein angle flange 71 extends downwardly therefrom at an angle of approximately 45 degrees. Each angle flange 71 has a perpendicularly oriented fastener aperture 73 therethrough for attaching an associated connector bridge 29. The upper edge 72 of each pan sidewall 66 is positioned a preselected distance below the upper pad 69 of raised pedestal 69 to accommodate the mounting of a connector bridge 29 on angle flanges 71, and thereby separating or dividing the interior space of L-shaped floor pan 26 between lower connector raceway 31, and upper connector raceway 32, as described in greater detail below. In the illustrated examples, the upper edges 72 of floor pan sidewalls 66 are positioned at around the vertical midpoint of raised pedestal 67. A pair of raised support channels 74 and 75 extend along the exterior facing side edges of pan base 65, and each includes a sidewall 76, endwalls 77, and an upper flange 78 positioned generally level with the upper pad 69 of pedestal 67. The upper flange 78 of each support channel 74 and 75 is shaped to support cover plates 28 thereon, and includes perpendicularly oriented fastener apertures 79 to facilitate detachable connection with cover plates 28.

With reference to FIGS. 14–17, the illustrated diagonal floor panel 27 is rigid, and has a generally U-shaped vertical cross-sectional configuration, comprising a W-shaped base 84, and two pairs of upstanding sidewalls 85. Diagonal floor pan 27 has one raised pedestal 86 positioned adjacent the interior facing corner of pan base 84, and is configured to support cover plates 28 thereon. Pedestal 86 has a generally hexagonal top plan configuration, with six sidewalls 87, and upper pad 88 with four perpendicularly oriented fastener apertures 89 therethrough arranged in a square pattern. Each pair of upstanding pan sidewalls 85 associated with diagonal floor pan 27 has an angle flange 90 along its upper edge 91, wherein angle flange 90 extends downwardly therefrom at an angle of approximately 45 degrees. Each angle flange 90 has a perpendicularly oriented fastener aperture 92 therethrough for attaching an associated connector bridge 29. The upper edge 91 of both pairs of pan sidewalls 85 is positioned a preselected distance below the upper pad 88 of pedestal 86 to accommodate the mounting of a connector bridge 29 on angle flanges 90, and thereby separating or dividing the interior space of diagonal floor pan 27 between lower connector raceway 31, and upper connector raceway 32, as described in greater detail below. In the illustrated example, the upper edges 91 of both pairs of floor pan sidewalls 85 are positioned at around the vertical midpoint of raised pedestal 86. A raised support channel 93 extends along the exterior facing side edge of pan base 84, and includes a sidewall 94, endwalls 95, and an upper flange 96 positioned generally level with the upper pad 88 of pedestal 86. The upper flange 96 of support channel 93 is shaped to support cover plates 28 thereon, and includes perpendicularly oriented fastener apertures 97 to facilitate the detachably connection of cover plates 28.

Floor pans 24–27 may be constructed from formed sheet metal, molded plastic, and other similar arrangements, and are preferably capable of effectively isolating various electrical wires, such as power conduits 7 and signal conduits 8 from one another. Although floor pans 24–27 are rigid to securely support cover plates 28 thereon, due to their modular construction, they will generally conform to an existing building floor surface 6, even when the same is not precisely level.

With reference to FIGS. 18–22, the illustrated connector bridge 29 is rigid, and has a generally U-shaped vertical cross-sectional configuration, comprising a flat or planar separator plate 30, having a pair of side flanges 102 depending from one pair of opposite side edges of plate 30, and a pair of upper flanges 103 upstanding from the opposite pair of side edges of plate 30. Side flanges 102 are oriented at an angle of approximately 45 degrees with respect to separator plate 30, extend generally continuously therealong, and each includes a pair of perpendicularly oriented fastener apertures 104 therethrough to facilitate connection with floor pans 24–27. Upper flanges 103 are oriented substantially perpendicular with respect to separator plate 30, and extend generally continuously along the side edges thereof. Like floor pans 24–27, connector bridge 29 may be constructed from formed sheet metal, molded plastic, or other similar arrangements, and is preferably capable of effectively isolating various electrical wires, such as power conduits 7 and signal conduits 8 from one another.

With reference to FIGS. 23–27, floor construction 2 is assembled in the following manner. Floor pans 24–27 are selected and arranged on the building floor surface 6 in the desired configuration, such as the arrangements shown in FIGS. 2 and 3. T-shaped floor pans 25 are generally arranged about the periphery or marginal portion of the floor construction 2, while L-shaped floor pans 26 are typically positioned at each right angle corner thereof. Diagonal floor pans 27 may be positioned about the marginal portion of a floor construction 2 which has one side disposed at a 45 degree angle with respect to the remaining sides. X-shaped floor pans 25 are typically positioned interior of the marginal portion of floor construction 2. Floor construction 2 can be arranged so that it covers the entire expanse of building floor 3, or can be configured to cover only selected areas thereof, so as to provide one or more utility pads that are located strategically throughout the open plan.

In all such embodiments, floor pans 24–27 (FIGS. 23–27) are arranged on building floor 3, such that the end edges of their associated bases are positioned adjacent one another in the manner illustrated in FIG. 23. Connector bridges 29 are then positioned over the joint formed between adjacent floor pans 24–27 in the manner illustrated in FIGS. 24–25. At each joint, the side flanges 102 of connector bridge 29 are positioned in abutment with the angle flanges of associated pan sidewalls, such as the angle flanges 42 of the X-shaped pan sidewalls 37 shown in FIGS. 24–26. Fasteners 108 are then inserted through the apertures 104 of connector bridge 29 and into the underlying apertures 44 in angle flanges 42, so as to securely interconnect adjacent floor pans 24–27 in their selected orientation, as illustrated in FIG. 27.

As best illustrated in FIGS. 25 & 26, the attachment of a connector bridge 29 to two adjacent floor pans 24–27 not only physically interconnects the same, but also assists in defining connector portions of the two utility raceways 4 and 5, which extend throughout floor construction 2. For example, when the two X-shaped floor pans 24 shown in FIG. 23 are interconnected by a connector bridge 29, as shown in FIG. 26, the interconnected leg portions 105 of pan bases 36 are enclosed by separator plate 30, such that pan base 36, pan sidewalls 37 and bridge separator plate 30 combine to create a fully enclosed raceway which is identified herein as lower connector raceway 31. Lower connector raceway 31 communicates directly with utility raceway 4, which is formed by the interior areas of the remaining floor pans 24–27. Connector bridge 29 also forms a portion of upper connector raceway 32, which is disposed directly above lower connector raceway 31, and is oriented perpendicular therewith. The upper connector raceway 32 is also fully enclosed after floor construction 2 is installed, and is defined by bridge separator plate 30, opposite bridge flanges 103, and cover plate 28. Upper connector raceway 32 communicates directly with utility raceway 5, which is formed by that space disposed beneath cover plates 28, and exterior to floor pans 24–27. In the illustrated example, utility raceway 4 is particularly designed to route electrical power conduits 7 through floor construction 2, while utility raceway 5 is particularly designed to route data and/or communication cables through floor construction 2.

After the selected floor pans 24–27 are interconnected by connector bridges 29 in the manner shown in FIGS. 23–27, and before assembly of cover plates 28, an initial utility installation may be made in floor construction 2. In the illustrated example, electrical power conduits 7 and signal cables 8 are installed in utility raceways 4 and 5 respectively in a fashion designed to provide utilities to each planned workstation, or in a predetermined plan which routes the utilities to each possible workstation location. In the floor construction shown in FIGS. 1–3, signal cables 8 can be simply laid in position in raceway 5 by routing them over that portion of the building floor disposed between adjacent floor pans 24–27, and over the separator plates 30 of selected connector bridges 29, through upper connector raceways 32, in a somewhat zigzag pattern. Electrical power conduits 7 are routed through raceway 4 by laying the same into the interior of floor pans 24–27, and threading the wires under the separator plates 30 of selected connector bridges, through lower connector raceways 31, in a checkerboard pattern. It is to be noted that in some installations, it may be possible to lay power conduits 7 in floor pans 24–27 before connector bridges 29 are attached, so as to avoid threading the wires through lower connector raceways 31.

With references to FIGS. 28–31, each of the illustrated cover plates 28 comprises a rigid base plate 112 having a substantially square top plan configuration, with four perpendicularly oriented fastener apertures 113 extending therethrough adjacent each corner of base plate 112. Each base plate 112 includes opposite side edges 114–117, and planar, mutually parallel upper and lower surfaces 118 & 119 respectively. In the example illustrated in FIG. 28, a segment of carpet 120, or other similar floor covering is adhered to the upper surface 118 of base plate 112. Base plate 112 may be constructed of sheet metal, plastic, or other similar materials which are capable of supporting substantial weight thereon without sagging.

Figure 3:
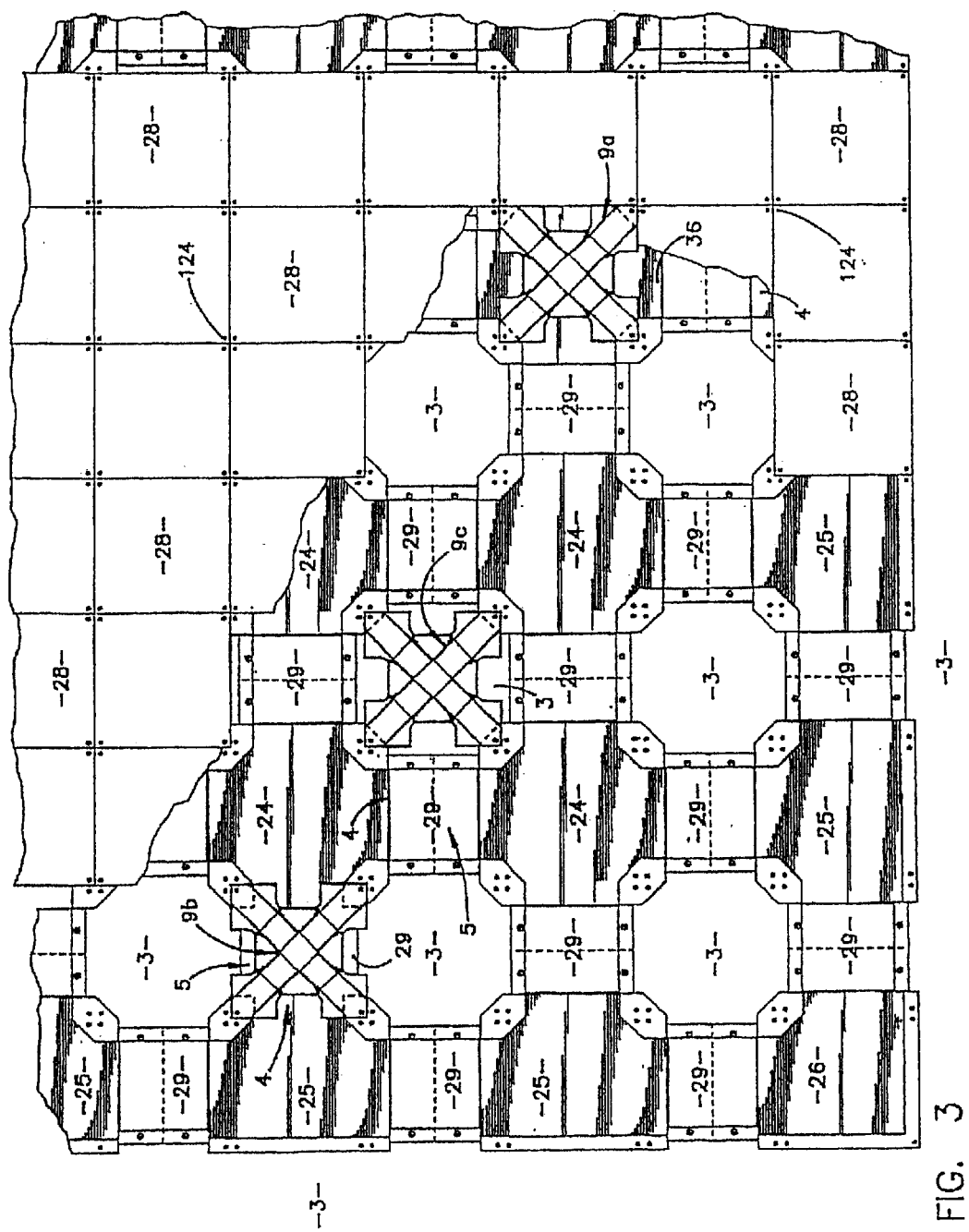
FIG. 3 is a fragmentary top plan view of the utility distribution system.

Cover plates 28 are assembled over the selected floor pans 24–27 to fully enclose floor construction 2, as shown in FIGS. 1 and 3. Cover plates 28 are juxtaposed side-by-side on floor pans 24–27 to form a continuous or uninterrupted floor surface 6 on which workstations and/or other furniture may be positioned. In the X-shaped floor pans 26 shown in FIGS. 29–31, a cover plate 28 is positioned on the four upper pads 40 of pan pedestals 38. Fasteners 124 are inserted through each of the four fastener apertures 113 in base plate 112 and mounted securely in the underlying pad apertures 41. Cover plates 28 are similarly mounted to floor pans 25–27, wherein cover plates 28 are also connected to the associated support channels, such as the support channel 57 of T-shape floor pan 25, the two support channels 74 and 75 of L-shaped floor pan 26, and the support channel 93 of diagonal floor pan 27.

Cover plates 28 not only serve to form the upper support surface 6 for floor construction 2, but also enclose the underlying floor space, which includes those areas above floor pans 24–27, as well as the remaining open areas of building floor 3. As a result, raceways 4 and 5 are both fully enclosed, and are mutually separated, with connector bridges 29 serving to permit cross-over between raceways 4 and 5, while maintaining physical isolation or separation. In the event local regulations specify that existing building floors can not qualify as an electrical barrier, a sheet of insulating material can be applied over building floor 3 prior to assembly of floor construction 2 thereon to improve its utility distribution capabilities, particularly with respect to utility raceway 5.

Figure 35:
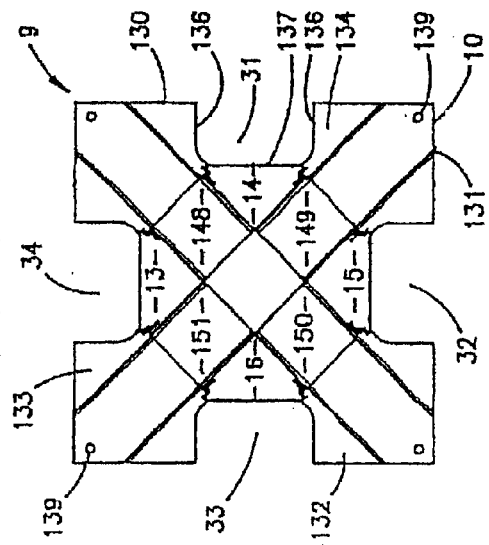
FIG. 35 is a cross-sectional view of the utility post, taken along the line XXXV—XXXV, FIG. 32.

The disclosed utility distribution system 1 (FIG. 1) also includes utility posts 9 which interact with floor construction 2 to distribute utilities to the various workstations. With reference to FIGS. 32–38, each of the illustrated utility posts 9 has a channel-like, elongated post portion 126, and a foot portion 10 shaped similar to cover plate 28, such that a cover plate 28 can be removed from floor pans 24–27, and the foot portion 10 of a utility post 9 mounted in its place. Utility posts 9 preferably have a rigid construction for upright mounting on floor construction 2, and may be provided in a plurality of different lengths or heights to accommodate a variety of needs and uses. With reference to FIG. 35, utility post foot 10 has a generally square overall plan configuration, similar to that of cover plate 28, and is defined by side edges 130–133, and upper and lower surfaces 134 and 135 respectively. Each of the side edges 130–133 of utility post foot 10 has an open, notched out area 31–36 located at a generally medial or central portion thereof. Each of the open foot notches 31–36 is defined by a base edge 137, and opposing side edges 138 oriented in a generally U-shaped plan configuration. Utility post foot 10 includes perpendicularly oriented fastener apertures 139 extending through each corner thereof, identical to the arrangement of fastener apertures 113 on cover plate 28.

Figure 34:
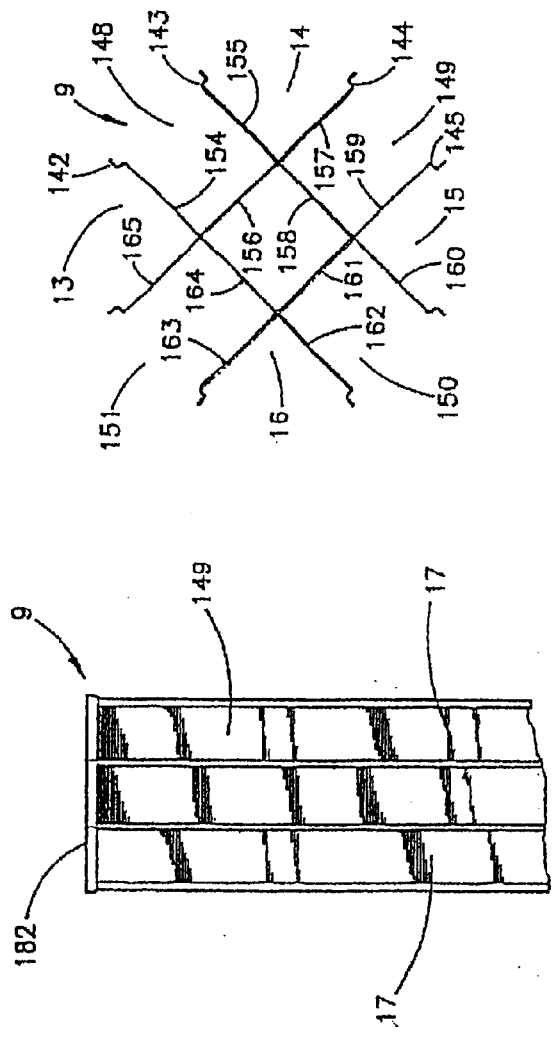
FIG. 34 is a horizontal cross-sectional view of the utility post, taken along the line XXXIV—XXXIV, FIG. 32.
Figure 33:
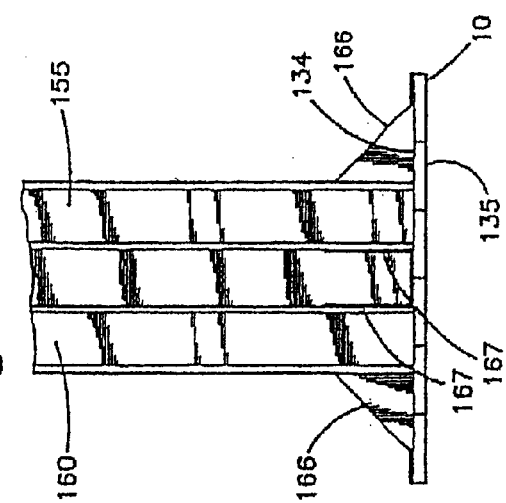
FIG. 33 is a side elevational view of the utility post.
Figure 32:
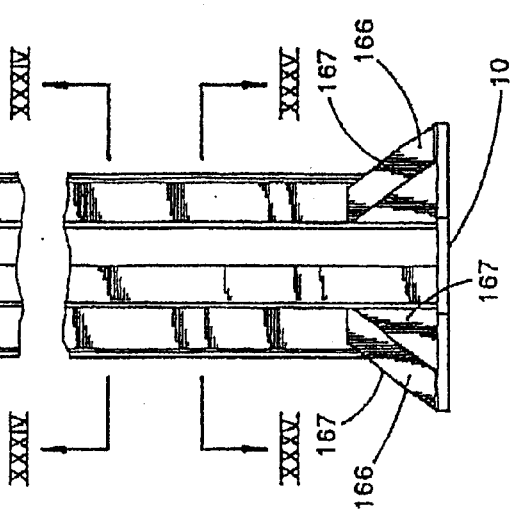
FIG. 32 is a front elevational view of the utility post.

As best illustrated in FIG. 34, the post portion 126 of utility post 9 has a generally X-shaped transverse cross-sectional configuration, comprising two parallel pairs of flat, perpendicularly intersecting walls 142–145. Intersecting walls 142–146 define a plurality of outwardly oriented, open-faced channels, which include four generally U-shaped mounting channels 148–151, and four generally V-shaped utility channels 13–16. The four mounting channels 148–151 are oppositely oriented in an outwardly radiating fashion, as are utility channels 13–16, which are positioned in between adjacent mounting channels 148–151. Mounting channel 148 is defined by wall segments 154–156, mounting channel 149 is defined by wall segments 157–159, mounting channel 150 is defined by wall segments 160–162, and mounting channel 151 is defined by wall segments 163–165. Utility channel 13 is defined by wall segments 154 and 165, utility channel 14 is defined by wall segments 155 and 157, utility channel 15 is defined by wall segments 159 and 160, and utility channel 16 is defined by wall segments 162 and 163. Four triangularly shaped gusset channels 166 interconnect the lower portion of post portion 126 with foot portion 10, and each includes a pair of sidewalls 167 oriented in radiating alignment with the corner fastener apertures 139 in foot portion 10. As best viewed in FIG. 35, the lower ends of utility channels 13–16 are aligned and communicate with an associated one of the open areas 31–34 of utility post foot 10, while the open ends of mounting channels 148–151 are aligned with the sidewalls 167 of an associated one of the gusset channels 116 on post foot 10.

Each of the utility channels 13–16 (FIGS. 36–38) has a generally triangular transverse cross-sectional configuration, and is adapted to receive and retain therein one or more utility conduits such as wires, cables, tubes, etc. Mounting channels 148–151 have a generally square transverse cross-sectional configuration, and are adapted to receive and retain therein one or more utility outlets 12, such as the illustrated duplex power outlet 168, the illustrated communication junction block 169, and other similar devices. Since mounting channels 148–151 are each generally open along their entire length, each utility channel can receive a plurality of utility outlets therein arranged in a vertically stacked configuration.

With reference to FIGS. 36–38, each of the utility channels 13–16 associated with utility post 9 includes a removable cover 170–173 which selectively encloses the same. In the illustrated example, each of the utility channel covers 170–173 includes a pair of inwardly angled side flanges 174 which matingly engage the outer free edges of the associated channel walls 142–145 to detachably mount the same on utility post 9 with a snap lock type of action. The illustrated utility post 9 also includes four, trapezoid shaped foot covers 178, which are positioned over the lower ends of utility channels 13–16. Each foot cover 178 (FIG. 36) includes an upper edge 179 extending adjacent the bottom on an associated one of the channel covers 170–173, a lower edge 180 extending along the upper surface 134 of post foot 10, and a pair of side edges 181 extending along the free edges of gusset sidewalls 167 to thereby enclose the lower part of each lower post portion 126 which is aligned with an associated utility channel 13–16. Foot covers 178 are detachably mounted to utility post 9 to permit ready access to the underlying raceways 4 and 5 in floor construction 2. Utility post 9 also includes a top cap 182 connected with the upper end of post portion 126, and enclosing the upper ends of each of the utility channels 13–16 and the mounting channels 148–151.

Figure 39:
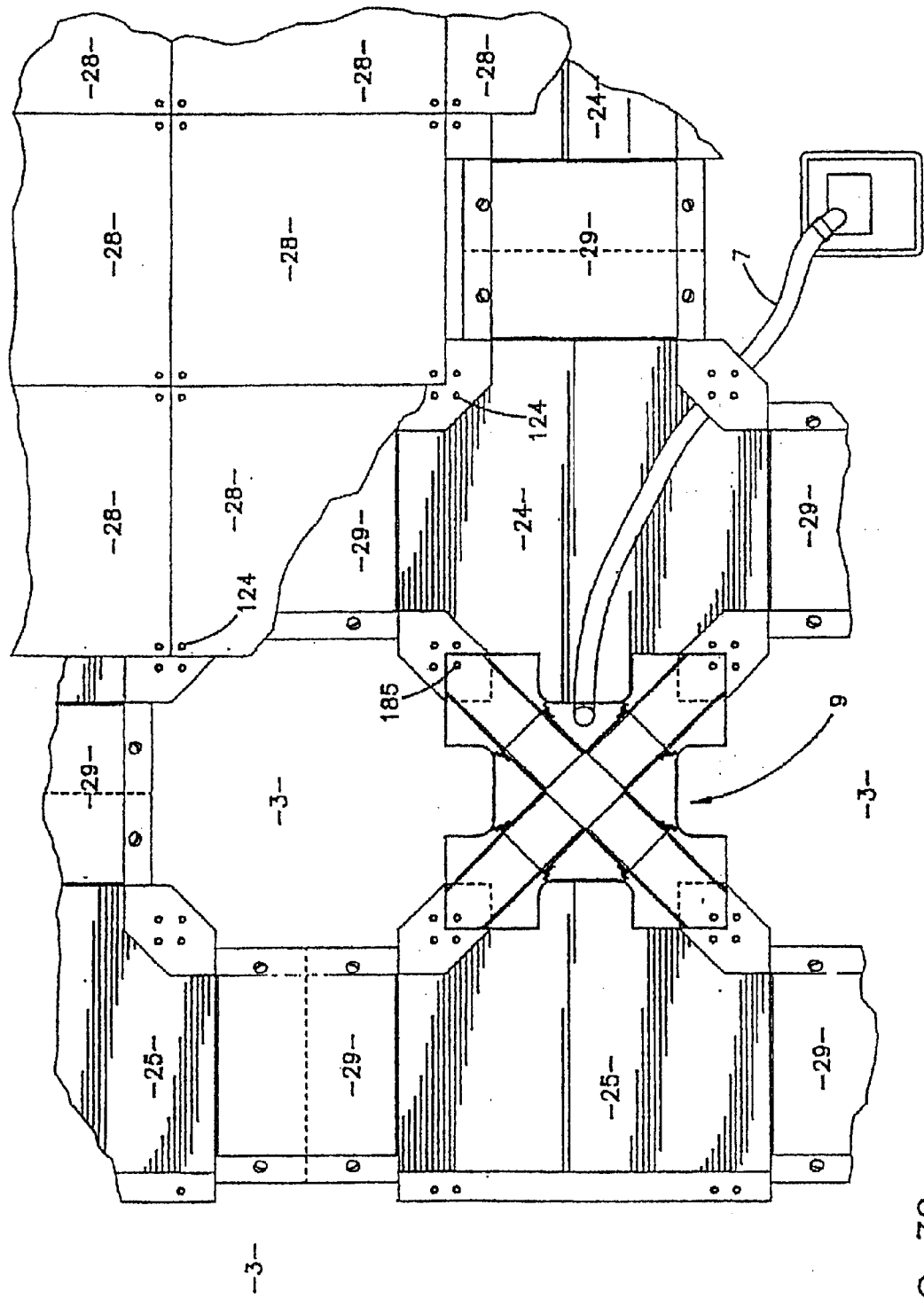
FIG. 39 is a fragmentary, top plan view of the floor construction with a utility post mounted thereon, with utility conduits being routed therethrough.

In operation, utility posts 9 may be assembled on floor construction 2 at any desired location in the following fashion. Assuming that cover plates 28 have been preassembled over each of the selected floor pans 25–27, the cover plate 28 disposed at that location at which each utility post 9 is desired must first be removed by simply removing associated fasteners 124, and detaching the selected cover plate 28 from its underlying floor pan or pans. A utility post 9 is then selected, and the foot portion 10 thereof is placed in the space vacated by the removed cover plate 28, such that foot base plate 112 is supported abuttingly on the underlying pan, such as in the arrangement shown in FIG. 39. Fasteners 185 are then inserted through the fastener aperture 139 in each corner of utility post foot 10, so as to securely mount utility post 9 on floor construction 2. Utility outlets 12 are mounted in the mounting channels 148–151 of utility post 9.

Mounting channels 148–151 are preferably preassigned or designated for use with certain types of utility outlets 12, so as to physically separate those utilities which might experience some degree of physical and/or functional interference. For example, the illustrated mounting channels 148 and 150 are assigned for power outlet devices, such as power outlet 168, and the opposite mounting channels 151 and 159 are assigned for communication junctions and other signal devices, such as signal block 169. Similarly, utility channels 13–16 are preferably preassigned or designated for use with certain types of utilities, such as power lines and signal cables. The illustrated utility channels 14 and 16 are assigned for power lines 7, and utility channels 13 and 15 assigned for signal cables or conductors 8. In any event, each of the various utility outlets 12 desired is mounted in an associated one of the mounting channels 148–152, preferably in accordance with the predesignated configuration noted above.

As best illustrated in FIG. 2, when utility post 9 is mounted on floor construction 2, the utility channels 13–16 are oriented to be in alignment with the underlying utility raceways 4 and 5. More specifically, one oppositely oriented pair of the utility channels 13–16 will open into utility raceway 4, and the other pair of oppositely oriented utility channels 13–16 will open into utility raceway 5. In the system shown in FIG. 2, utility raceway 4 has been designated for electrical power conduits 7, and utility raceway 5 has been designated for signal conduits 8, which include communication lines, data wireg, etc. Hence, utility post 9 has been oriented on the X-shaped floor pan 24 to which it is attached with utility channel 16 and U-shaped foot opening 33 communicating with a forwardly facing side of power raceway 4, and utility channel 14 and U-shaped foot opening 31 communicating with a rearwardly facing side of power raceway 4. Furthermore, in this orientation, utility channel 15 and U-shaped foot opening 32 communicate with the forwardly facing side of signal raceway 5, and utility channel 13 and U-shaped foot opening 34 communicate with a rearwardly facing side of signal raceway 5. Power conduits 7 and signal conduits 8 may be fed into floor construction 2 in a variety of different ways, including the floor feed arrangement shown in FIG. 39 for power conduit 7, or the side feed arrangement shown in FIG. 2 for power conduits 7 and signal conduits 8.

With reference to FIG. 3, it will be noted that utility post 9 can be mounted at a plurality of locations on floor construction 2, including mounting on the four pedestals 38 of a single X-shaped floor pan 24, directly above the center portion of its associated base 36, as illustrated utility post 9a, or alternatively between the adjacent legs 105 of a T-shaped floor pan 25 and a X-shaped floor pan 24, directly above the connector bridge 29, as in illustrated utility post 9b, or alternatively on the four pedestals of four adjacent X-shaped floor pans 24, directly above the open building floor 3, as in illustrated utility post 9c. In each of these orientations, the utility channels 13–16 of the utility post 9 can be communicated with the utility raceways 4 and 5 in floor construction 2 to permit routing utilities, such as power conduits 7 and signal conduits 8 therethrough.

Utility conduits 7 and 8 are then routed from their associated raceways 4 and 5 within floor construction 2 to each of the selected utility outlets 12 in the following fashion. Selected cover plates 28 are first removed from around utility post foot 10, so as to expose the underlying raceways 4 and 5, and determine what utility conduits 7 and 8 are readily available. Utility conduits 7 and 8 are then selected and routed into the selected ones of the utility channels 13–16 by first routing the same through that one of the open foot areas 31–34 associated with the selected one of the utility channels 13–16. The utility conduits 7 and 8 are simply laid into the selected utility channels 13–16 by insertion into the open faces 17 thereof to a location adjacent the associated utility outlet 12 to which it is to be connected. An aperture is formed in the wall of post portion 126 disposed between the utility channel and the selected utility outlet, so that the selected utility conduit can be inserted into the utility outlet and thereby connected. After each such utility outlet 12 is similarly connected with its associated utility conduit 7 or 8, channel covers 170–173 are mounted over each utility channel 13–16, and foot covers 178 are mounted at the base of post portion 126.

With reference to FIG. 1, in one embodiment of the present invention, utility posts 9 are positioned free standing on floor construction 2 adjacent those locations at which the selected utilities are desired. For instance, freestanding utility post 9a is positioned for use with a panel based systems furniture system 190, and may extend up through and/or adjacent associated worksurfaces 191. Utility post 9 might also be positioned between the sides of adjacent partition panels (not shown) to function as a spine with outlets 12 accessible on both sides of the panel system. Alternatively, the illustrated freestanding utility post 9b is used as a bollard for a mobile table system 192.

In yet another embodiment of the present invention, utility post 9 may be physically incorporated into a furniture system. For example, the illustrated utility post 9c is used to support a tabletop 193. Alternatively, the illustrated utility posts 9d are used as support columns in an overhead partitioning system 194, which is the subject of commonly assigned U.S. Pat. No. 5,511,348. Utility posts 9 might be used as the vertical uprights in the workspaced module arrangement which is the subject of commonly assigned U.S. Pat. No. 5,282,341. It is to be understood that utility post 9 may also be used to support a wide variety of other types of furniture applications, such as supports for partition panels, furniture unit supports, etc.

Utility distribution system 1 is quite versatile, and provides not only a unique prefabricated floor construction 2 which is adapted to physically separate different types of utility conduits to avoid interference, but also a novel utility post 9 which permits the distribution of utilities from the floor construction 2 at various locations throughout the system. Utility distribution system 1 is very efficient, and quite adaptable to effectively support a wide variety of different furniture systems and configurations.

Figure 40:
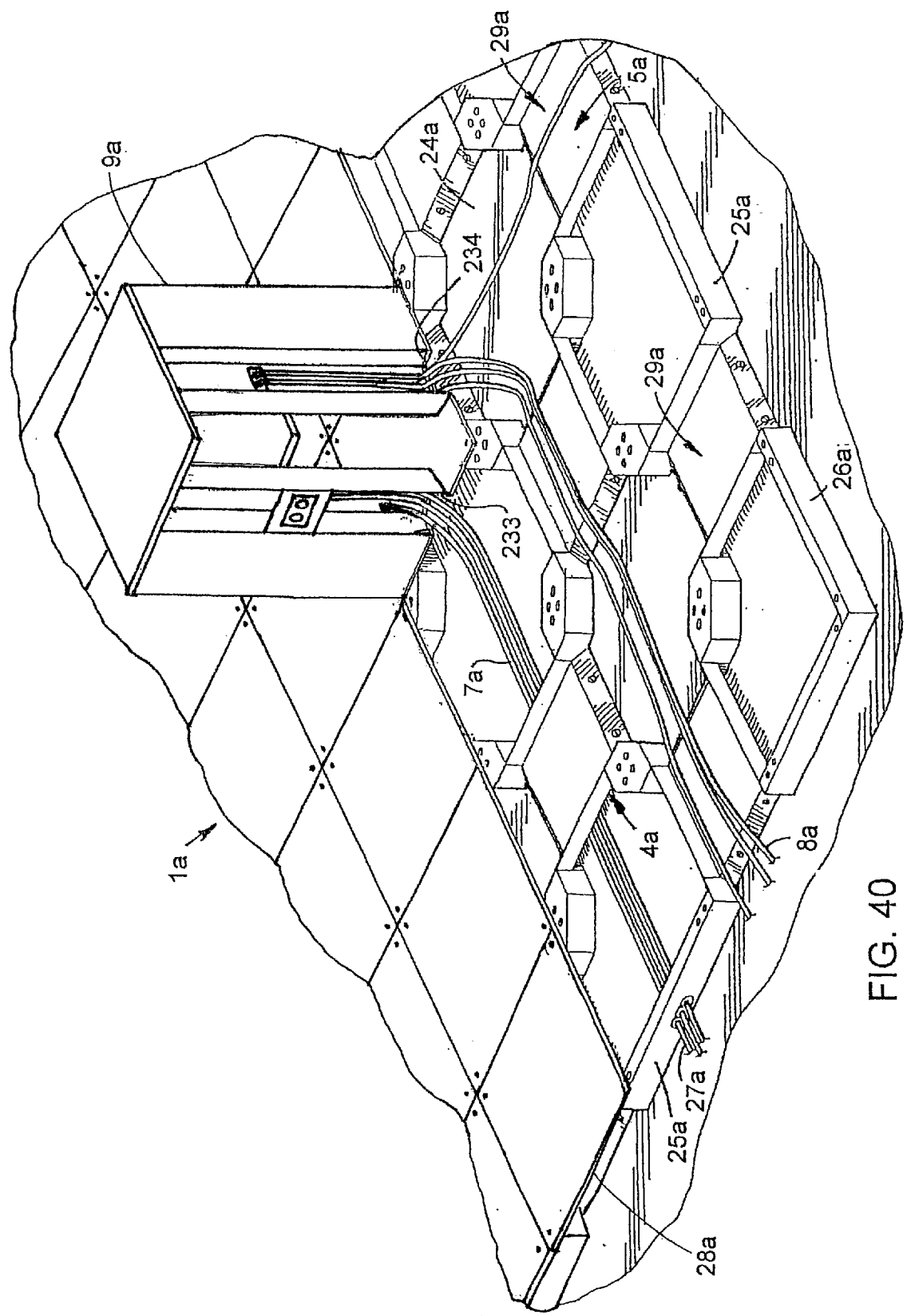
FIG. 40 is fragmentary perspective view of a second embodiment of the floor mounted utility post mounted on the floor construction, wherein floor tile portions of the floor construction have been removed to reveal internal construction and utility conduit routing.

The reference numeral 1a (FIG. 40) generally designates a raised floor construction incorporating a plurality of supports such as central supports 24a, end supports 25a, and corner supports 26a, which are interconnected one to the other by bridges 29a to form a lattice-like support structure, which, in combination, also defines a hollow interior arrangement of first raceways 4a and second raceways 5a, to route first utility conduits 7a and second utility conduits 8a therethrough. A floor surface comprising a plurality of floor tiles 28a is supported by the underlying support structure. A floor mounted utility post 9a, including vertical channels 233 and 234 facilitates the routing of utility conduits 7a and 8a, respectively, from the underlying floor raceways 4a and 5a for presentation of the utilities to an office worker for access and use thereof.

Figure 41:
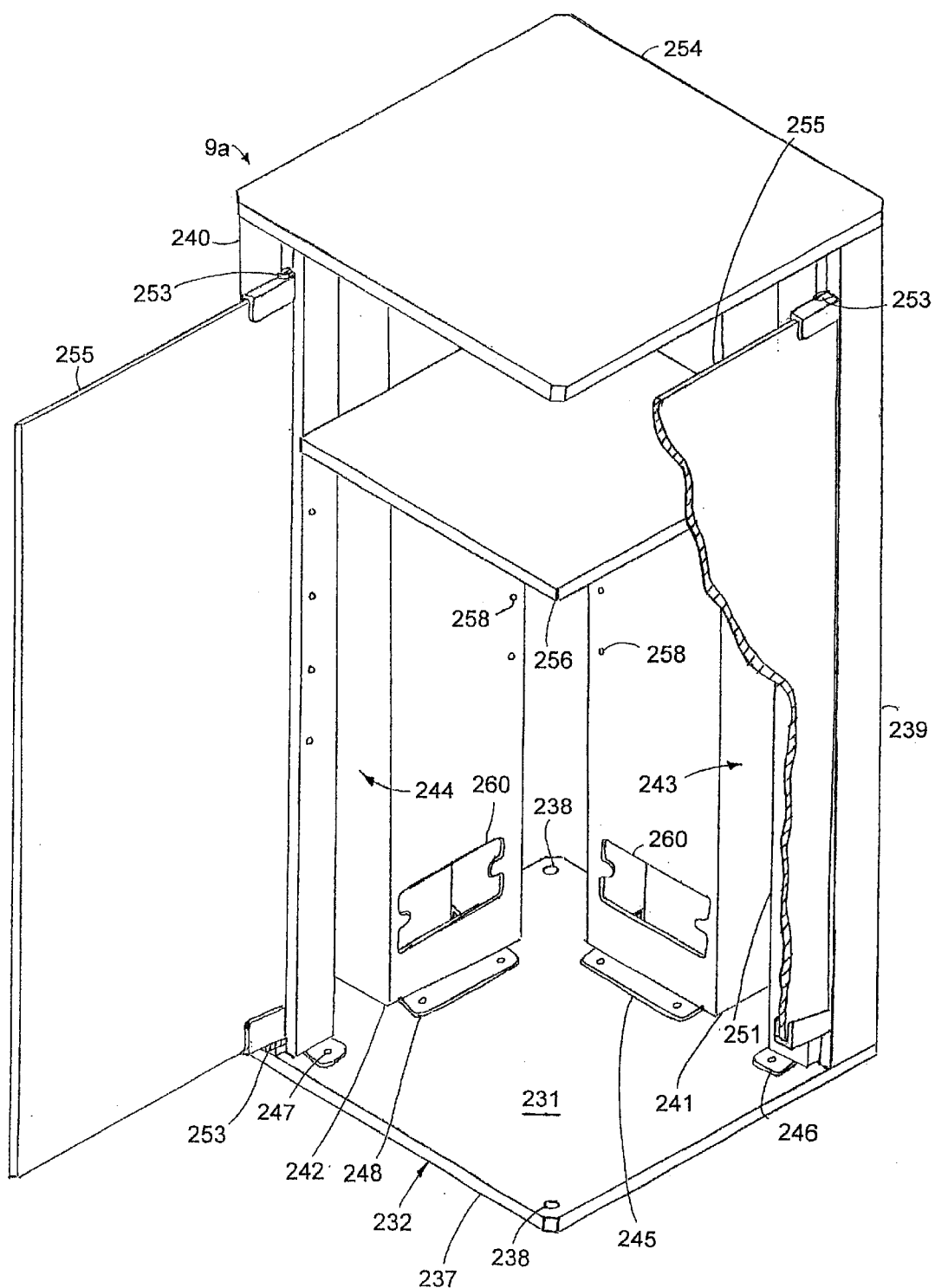
FIG. 41 is a perspective view of the second embodiment of the floor mounted utility post incorporating one door and one shelf mounted therein.
Figure 42:
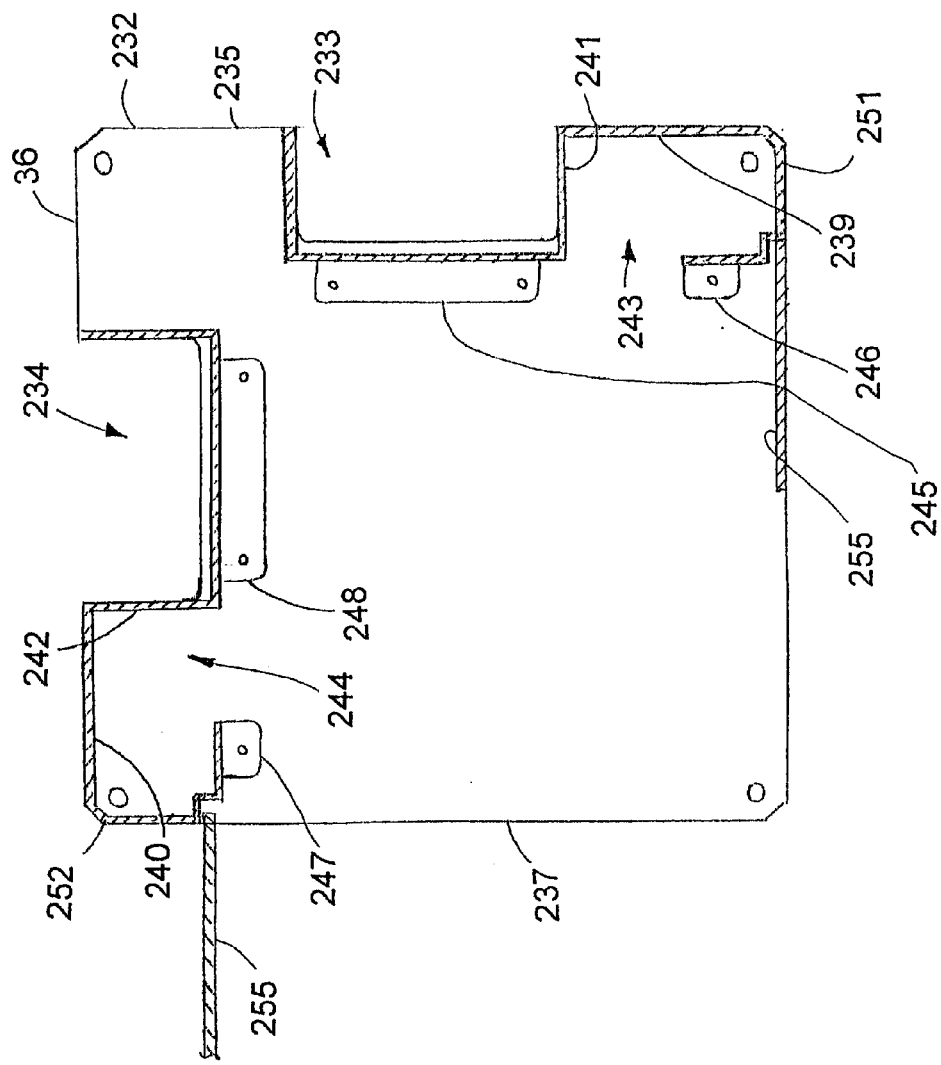
FIG. 42 is a cross-sectional view of the second embodiment of the floor mounted utility post taken along the line XLII—XLII of FIG. 41.

As best illustrated in FIGS. 41 and 42, a preferred embodiment of floor mounted utility post 9a, is comprised of a bottom 232, which can be uniquely constructed to replace a particular floor tile 28a, or alternatively, can be a floor tile 28a which is modified to facilitate the mounting of the remainder of the utility post structure thereon. Bottom 232 includes cutouts or channels 233 and 234 at first and second adjacent peripheral edges, respectively. Bottom 232 also includes holes 238 configured to correspond with the mounting hole pattern of floor tiles 28a for securing floor mounted utility post 9a to the underlying floor support structure. Bottom 232 can be formed from any base or floor tile from any raised floor construction by configuring the base to replace an existing floor tile or by modifying the existing floor tile with notches and then attaching vertical raceways to the base as discussed below.

A pair of mirror image vertical raceways 239 and 240 include U-shaped raceway channels 241 and 242, and are positioned on bottom 232 in such a manner that raceway channels 241 and 242 are aligned with and communicate with cutouts 233 and 234 respectively. Cutouts 233 and 234 and raceway channels 241 and 242 face the exterior of utility post 9a and provide an unobstructed channel to facilitate the routing of utility conduits 7a and 8a in a lay-in manner without necessitating the feeding of utility conduits through an aperture for placement within channels 241 and 242, Tabs 245–248 at the bottoms of raceways 239 and 240 abut an upper surface 231 of bottom 232, for attaching vertical raceways 239 and 240 to bottom 232. Attachment of tabs 245–248 to bottom 232 can be made in any number of ways which are known in the art, such as using screws, welding, glues, and the like, depending on the materials used to fabricate bottom 232 and vertical raceways 239 and 240.

In the preferred embodiment each of vertical raceways 239 and 240 includes a flange 251 and 252, respectively, extending about a portion of the periphery of bottom 232 at opposite corners of bottom 232. While various geometrical configurations of the combined raceway and flange are possible and contemplated herein, the preferred embodiment combines the vertical channel 241 and flange 251 to define in top plan an S-shaped raceways 239. Likewise, vertical channel 242 and flange 252 are combined to define raceway 240 in a reverse S-shape. For purposes herein, both configurations are referred to as S-shaped. The second loop of the S-shape opens to the interior of post 9a thereby defining first and second inner channels 243 and 244 that function as an internal raceway in post 9a for the vertical routing of utility conduits in the interior of post 9a.

At least one of flanges 251 and 252 such as flange 252 and has hinges 253 mounted at an upper and lower position thereon, to support a door 255. Door 255 is moveable between an open position, as shown in FIG. 41, permitting access to an interior of utility post 9a, and a closed position, which is parallel to third peripheral edge 237 of bottom 232. Doors 255 are somewhat smaller in height than the opening to which they are hinged, and in the preferred embodiment are made from either translucent or smoked glass. Doors 255 define in combination with top 254 and bottom 230 of post 9a top and bottom gaps 265 and 266 that can be used to route utility conduits from an interior of post 9a to a work area remote from the post. When used as a sole utility post, utility post 9a can also include a second door 255 mounted in like manner to flange 251 of vertical raceway 239 to further enclose the interior of utility post 9a. A top 254 is attached to upper ends of vertical raceways 239 and 240 to provide additional enclosure of the interior of utility post 9a and to provide a surface upon which office utilities may be placed or office activities can be performed. It will also be understood that top 254 can comprise a variety of configurations such as enclosures for multiple utility outlets, platforms for projectors, podium or lectern tops for presentation, and the like.

A shelf 256 can be supported in the interior portion of utility post 9a, utilizing screws or pegs to support the shelf at flanges 251 and 252, and raceway channels 241 and 242, respectively in a manner well known in the art. The interior volume of post 9a facilitates utility conduit storage for the routing of temporary utility extensions to a remote work location on an as needed basis. A plurality of holes 258 can be provided at various vertical heights along the vertical length of raceway channels 241 and 242 and flanges 251 and 252, to facilitate the vertical repositioning of shelf 256. Raceway channels 241 and 242 can also include apertures 260 therethrough, for the routing of utility conduits 7a and 8a (FIG. 40) to the interior of utility post 9a, for connection to utility articles housed within utility post 9a and supported by bottom 232 or shelf 256. Additionally, apertures 260 can be configured to mount standard utility receptacles therein.

Referring now to FIG. 43, an alternate configuration and use of utility post 9a is shown as a dual utility post, shown generally at 264. Dual utility post 264 is comprised of two identical utility posts 9a which replace two adjacent floor tiles 28, and can be configured as a cabinet to house larger pieces of utility equipment therein. Dual utility post 264 is formed by removing opposite doors 255 from each of adjacent utility posts 9a, and abutting the sides of utility post 9a not including a door 255 one to the other. Such an abutting arrangement of single utility posts 9a will form a cabinet-like unit, wherein each of a left and right sides are defined by a vertical raceway 240 of a first of utility posts 9a, and by a vertical raceway 239 of the second of the utility posts 9a. The back of the dual utility post 264 is formed by the others of the vertical raceways 239 and 240. The front of the dual utility post 264 is formed by the remaining doors 255 which are separately hinged at the right and left ends of dual utility post 264. The top of the cabinet can comprise two individual tops 254 as utilized on individual utility posts 9a, or alternatively comprise one top (not shown) sufficiently large to cover both utility posts 9a. The doors 255 have been deleted from FIG. 43, for purposes of clarity.

As shown in FIG. 43, outwardly facing raceway channels 241 and 242 can be enclosed with one or a plurality of vertically stacked covers 267 and 268. The covers can be configured as solid covers 267 for the sole purpose of enclosing raceway channel 241 or 242, or alternately, can be configured as cover 268, incorporating a utility outlet 269 therein for presentation of utilities to the exterior of utility post 9a or 264 access to office workers in the vicinity of Utility posts 9a or 264. Additionally, the covers can be provided in different sizes to facilitate the desired height and cover configuration. In the preferred embodiment the covers are manufactured in three sizes having a height ratio of 1:2:3, although other ratios can be also be used to obtain the identical functionality. The segmented covers permit the mounting of utility outlets at varying heights as defined by the requirements of the user. Utility outlet 269 is shown as an electrical power outlet, however it will be understood that outlet 269 can be of any configuration which is appropriate to deliver the desired type of utility and interface connector to the potential user.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

We claim:

1. A floor mounted utility post comprising:
    a floor tile shaped for installation in a prefabricated floor construction, said floor tile having at least two cutouts therein, positioned at separate edges of said floor tile;
    a pair of vertical raceway channels secured to said floor tile, each of said vertical raceway channels being in communication with one of said cutouts;
    a top connected with upper portions of said raceway channels; and
    a door mounted to a first one of said raceway channels wherein said door, said top, and said pair of vertical raceway channels in combination define a partial enclosure.

2. The floor mounted utility post of claim 1 wherein at least one of said vertical raceway channels has an S-shaped cross section defining two parallel channels, a first parallel channel facing an exterior of said post for external routing of utility conduits and a second parallel channel facing an interior of said post for internal routing of utility conduits.

3. The floor mounted utility post of claim 1, further including at least one shelf mounted to said vertical raceway channels.

4. The floor mounted utility post of claim 1, wherein said Cutouts in said floor tile are positioned at an outside margin of said floor tile, such that each said cutout is a notch in an edge of said floor tile.

5. The floor mounted utility post of claim 4, wherein said raceway channels are outwardly oriented and have and open face, such that an office utility conduit can be routed into said raceway channels in a lay-in manner.

6. The floor mounted utility post of claim 5, further including at least one vertically positioned cover to enclose said raceway channels.

7. The floor mounted utility post of claim 6, wherein said at least one vertically positioned cover includes a utility receptacle.

8. The floor mounted utility post of claim 7, wherein said raceway channels define appertures for the routing of office utility conduits to an interior of said post.

9. The floor mounted utility post of claim 1, further including a second door mounted to a second of said raceway channels.

10. The floor mounted utility post of claim 1 adjacent to and in combination with a second like floor mounted utility post, said utility posts forming a cabinet wherein said raceway channels form a back and sides of said cabinet and have a front thereof open for mounting of electrical equipment therein.

11. A floor mounted utility post in combination with a prefabricated floor construction, said floor construction comprising a plurality of floor tiles adapted to be abuttingly supported on a building floor, and further including a hollow interior portion thereof defining at least one floor raceway to route at least one utility conduit therethrough, said utility post comprising:
    a bottom configured to replace one of said floor tiles in said prefabricated floor construction, said bottom having a notch in at least one peripheral edge in communication with said at least one floor raceway for routing the utility conduit therethrough;
    two outwardly facing vertical raceways, said vertical raceways extending upwardly from adjacent peripheral edges of said bottom, at least a first of said vertical raceways in communication with said notch;
    a door mounted to one of said vertical raceways for selective access to an interior of said utility post, said door movable between a closed position and an open position; and
    a top supported by upper edges of said at least two adjacent vertical raceways.

12. The floor mounted utility post of claim 11 wherein at least one of said vertical raceways has an S-shaped cross section defining two parallel channels, a first parallel channel facing an exterior of said post for external routing of utility conduits and a second parallel channel facing an interior of said post for internal routing of utility conduits.

13. The combination of claim 11, further including at least one shelf mounted to said vertical raceways.

14. The combination of claim 11, wherein said floor raceway is defined by two side flanges of a bridge plate.

15. The combination of claim 11, wherein said bottom includes a second notch in a second peripheral edge, said second notch in being in communication with a second of said vertical raceways, and in communications with a second floor raceway.

16. The combination of claim 15, further including a second floor mounted utility post adjacent to said floor mounted utility post, said utility posts forming a cabinet wherein said vertical raceways form a back and sides of said cabinet, and having a front thereof open for mounting of electrical equipment therein.

17. The combination of claim 16, wherein said vertical raceways have an open face such that an office utility conduit can be routed into said vertical raceways in a lay-in manner.

18. The combination of claim 17, further including a plurality of vertically stacked covers enclosing said vertical raceways and further wherein at least one of said vertically stacked covers includes a utility receptable.

19. A utility cabinet comprising a pair of adjacent floor mounted utility posts and in combination with a prefabricated floor construction, said floor construction comprising a plurality of floor tiles adapted to be abuttingly supported on a building floor, and including a hollow interior portion thereof defining at least one floor raceway to route at least one utility conduit therethrough, each said utility post comprising:

a bottom configured to replace one of said floor tiles in said prefabricated floor construction, said bottom having a notch in at least one peripheral edge in communication with said at least one floor raceway for routing the utility conduit therethrough;

at least one outwardly facing vertical raceway, said vertical raceway extending upwardly from a peripheral edge of said bottom, said vertical raceway in communication with said notch;

a door mounted to said at least one vertical raceway and vertically aligned with a second peripheral edge of said bottom, said door movable between a closed position and an open position for selective access to an interior of said utility post; and a top at least partially supported by an upper edge of said at least one vertical raceway.

20. The utility cabinet of claim 19 wherein:
said floor construction further defines a second floor raceway;
said at least one outwardly facing vertical raceway of a first of said utility posts communicates with said at least one floor raceway; and
said at least one outwardly facing vertical raceway of a second of said utility posts communicates with said second floor raceway.

21. A method of constructing a floor mounted utility post for used with a prefabricated floor structures, said method comprising the steps of:

fabricating at least two vertical utility raceways constructed to receive office utility conduits therein, and further wherein the at least two vertical raceways define a vertical opening;

fastening a bottom of a first of the raceways proximate a first edge of a floor tile for use with the prefabricated floor structure;

fastening a bottom of a second of the raceways proximate a second edge of the floor tile, the second edge being adjacent the first edge, and at least a portion of the second raceway also proximate a third edge of the floor tile;

mounting a door to the second raceway portion proximate the third edge of the floor tile, wherein the door is movable between a closed position substantially parallel the third edge of the floor tile and an open position permitting access to an interior of the post; and fastening a post top to a top of each of the vertical raceways.

22. The method according to claim 21 further including the step of:

attaching at least one vertically positioned cover to an exterior of at least one of the raceways to enclose the raceway.

23. The method according to claim 21 including, prior to the step of fastening a bottom of a first of the raceways, the step of:

orienting the first of the vertical raceways such that the open vertical side of the first of the vertical raceways faces an outer perimeter of the floor tile.

24. The method according to claim 23 including the step of:

producing a notch in the edge of the floor tile and in vertical alignment with the first raceway such that office utility conduits can be laid in the first raceway without requiring the conduits to be fed through an aperture in the floor tile.

25. A floor mounted utility post comprising:

a base shaped for mounting on a prefabricated floor construction, said base having at least two cutout therein, positioned at separate edges of said base;

a pair of vertical raceway channels secured to said base, each of said vertical raceway channels being in communication with one of said cutouts;

a top connected with upper portions of said raceway channels; and a door mounted to a first one of said raceway channels wherein said door, said top, and said pair of vertical raceway channels in combination define a partial enclosure.

26. The floor mounted utility post of claim 25 wherein at least one of said vertical raceway channels has an S-shaped cross section defining two parallel channels, a first parallel channel facing an exterior of said post for external routing of utility conduits and a second parallel channel facing an interior of said post for internal routing of utility conduits.

27. The floor mounted utility post of claim 25, further including at least one shelf mounted to said vertical raceway channels.

28. The floor mounted utility post of claim 25, wherein said cutouts in said base are positioned at an outside margin of said base, such that each said cutout is a notch in an edge of said base.

29. The floor mounted utility post of claim 28, wherein said raceway channels are outwardly oriented and have an open face, such that an office utility conduit can be routed into said raceway channels in a lay-in manner.

30. The floor mounted utility post of claim 29, further including at least one vertically positioned cover to enclose said raceway channels.

* * * * *

UNITED STATES PATENT AND TRADEMARK OFFICE
CERTIFICATE OF CORRECTION

PATENT NO. : 6,311,440 B1
DATED : November 6, 2001
INVENTOR(S) : Thomas G. Feldpausch et al.

It is certified that error appears in the above-identified patent and that said Letters Patent is hereby corrected as shown below:

Column 2,
Line 30, "Pach" should be -- Each --.
Line 33, after "door" insert -- is --.

Column 4,
Line 21, before "fragmentary" insert -- a --.

Column 5,
Line 29, after "top" insert -- of --.

Column 6,
Line 59, "general" should be -- generally --.

Column 7,
Line 9, "pedestal 69" should be -- pedestal 67 --.
Line 54, "detachably" should be -- detachable --.

Column 9,
Line 59, "T-shape" should be -- T-shaped --.

Column 10,
Line 4, "can not" should be -- cannot --.
Line 37, "walls 142-146" should be -- walls 142-145 --.
Line 43, "inbetween" should be -- in between --.

Column 11,
Line 54, "channels 151 and 159" should be -- channels 151 and 149 --.
Line 63, "channels 148-152" should be -- channels 148-151 --.

Column 12,
Line 9, "wireg" should be -- wires --.

Column 15,
Line 29, "Utility" should be -- utility --.
Line 33, delete "be" (first occurrence).

UNITED STATES PATENT AND TRADEMARK OFFICE
CERTIFICATE OF CORRECTION

PATENT NO. : 6,311,440 B1
DATED : November 6, 2001
INVENTOR(S) : Thomas G. Feldpausch et al.

It is certified that error appears in the above-identified patent and that said Letters Patent is hereby corrected as shown below:

Column 16,
Line 8, "Cutouts" should be -- cutouts --.
Line 12, "and open" should be -- an open --.

Column 18,
Line 30, "cutout" should be -- cutouts --.

Signed and Sealed this

Twenty-third Day of April, 2002

Attest:

Attesting Officer

JAMES E. ROGAN
Director of the United States Patent and Trademark Office